United States Patent
Tsunoda et al.

(10) Patent No.: US 10,511,677 B2
(45) Date of Patent: Dec. 17, 2019

(54) INFORMATION PROCESSING METHOD, INFORMATION PROCESSING DEVICE, AND INFORMATION PROCESSING SYSTEM

(71) Applicant: FUJITSU LIMITED, Kawasaki-shi, Kanagawa (JP)

(72) Inventors: Tadanobu Tsunoda, Yokohama (JP); Takashi Ohno, Kobe (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 15/795,235

(22) Filed: Oct. 26, 2017

(65) Prior Publication Data
US 2018/0146052 A1 May 24, 2018

(30) Foreign Application Priority Data
Nov. 21, 2016 (JP) .................. 2016-226082

(51) Int. Cl.
H04L 1/00 (2006.01)
H04L 29/08 (2006.01)
H04W 64/00 (2009.01)

(52) U.S. Cl.
CPC .............. H04L 67/18 (2013.01); H04L 67/34 (2013.01); *H04W 64/00* (2013.01)

(58) Field of Classification Search
None
See application file for complete search history.

(56) References Cited

U.S. PATENT DOCUMENTS

2016/0062589 A1\* 3/2016 Wan ...................... G06F 3/0483

FOREIGN PATENT DOCUMENTS

| JP | 2005-268842 | 9/2005 |
|----|-------------|--------|
| JP | 2014-071845 | 4/2014 |

\* cited by examiner

*Primary Examiner* — Cai Y Chen
(74) *Attorney, Agent, or Firm* — Fujitsu Patent Center

(57) ABSTRACT

An information processing method executed by a processor included in an information processing device, the information processing device including a sensor, the information processing method includes acquiring information of a location of the information processing device using the sensor; determining a distribution area with which one or more applications are associated; specifying a terminal device that communicates with the information processing device via a network; extracting one or more applications associated with the distribution area where the location of the information processing device is included; and transmitting the extracted one or more applications to the specified terminal device.

16 Claims, 18 Drawing Sheets

| RULE ID | DISTRIBUTION APP ID | DISTRIBUTION AREA (AREA COORDINATES) |
|---|---|---|
| r001 | app1 | (x1,y1,z1) , (x2,y2,z2) |
| r002 | app2 | (x3,y3,z3) , (x4,y4,z4) |
| r003 | app3 | (x5,y5,z5) , (x5,y5,z5) |
| ... | ... | ... |

FIG. 9

| RULE ID | DISTRIBUTION APP ID | DISTRIBUTION AREA (AREA COORDINATES) | TIME SLOT |
|---|---|---|---|
| r001 | app1 | (x1,y1,z1) , (x2,y2,z2) | 0:00 ~ 11:59 |
| r002 | app9 | (x1,y1,z1) , (x2,y2,z2) | 12:00 ~ 23:59 |
| r003 | app2 | (x3,y3,z3) , (x4,y4,z4) | — |
| r004 | app3 | (x5,y5,z5) , (x5,y5,z5) | — |
| ... | ... | ... | ... |

| RULE ID | DISTRIBUTION APP ID | DISTRIBUTION AREA (AREA COORDINATES) | CLASS |
|---|---|---|---|
| r001 | app1 | (x1,y1,z1) , (x2,y2,z2) | COMPANY A |
| r002 | app2 | (x1,y1,z1) , (x2,y2,z2) | COMPANY B |
| r003 | app2 | (x3,y3,z3) , (x4,y4,z4) | COMPANY C |
| r004 | app3 | (x5,y5,z5) , (x5,y5,z5) | COMPANY D |
| ... | ... | ... | ... |

INFORMATION PROCESSING METHOD, INFORMATION PROCESSING DEVICE, AND INFORMATION PROCESSING SYSTEM

CROSS-REFERENCE TO RELATED APPLICATION

This application is based upon and claims the benefit of priority of the prior Japanese Patent Application No. 2016-226082, filed on Nov. 21, 2016, the entire contents of which are incorporated herein by reference.

FIELD

The embodiments discussed herein are related to an information processing method, an information processing device, and an information processing system.

BACKGROUND

A service in which, using location information of a terminal device, which has been measured by a global positioning system (GPS) receiver or the like, an area in which the terminal device exists is specified and an application that is associated with the specified area is distributed to the terminal device has been known.

A service in which an application that is associated with an area is distributed to a terminal device will be hereinafter referred to as an "app distribution service". For example, Japanese Laid-open Patent Publication No. 2005-268842 or the like discusses related art.

However, in an area in a building, a tunnel, or the like, a radio wave from a GPS satellite is not received or is hard to be received, and therefore, there are cases in which location information of the terminal device is not measured by the GPS receiver.

Therefore, depending on areas in which a terminal device exists, there are cases in which the terminal device that is located in an area in which the terminal device is to receive an app distribution service is not able to use the app distribution service. In view of the foregoing, it is preferable that it is possible to expand an area in which an app distribution service is available.

SUMMARY

According to an aspect of the invention, an information processing method executed by a processor included in an information processing device, the information processing device including a sensor, the information processing method includes acquiring information of a location of the information processing device using the sensor; determining a distribution area with which one or more applications are associated; specifying a terminal device that communicates with the information processing device via a network; extracting one or more applications associated with the distribution area where the location of the information processing device is included; and transmitting the extracted one or more applications to the specified terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a table illustrating another example of a distribution rule table according to the first embodiment;

FIG. 12 is a table illustrating an example of a distribution rule table according to the second embodiment;

DESCRIPTION OF EMBODIMENTS

Embodiments of the present disclosure will be described below with reference to the accompanying drawings.

First Embodiment

Figure 1:
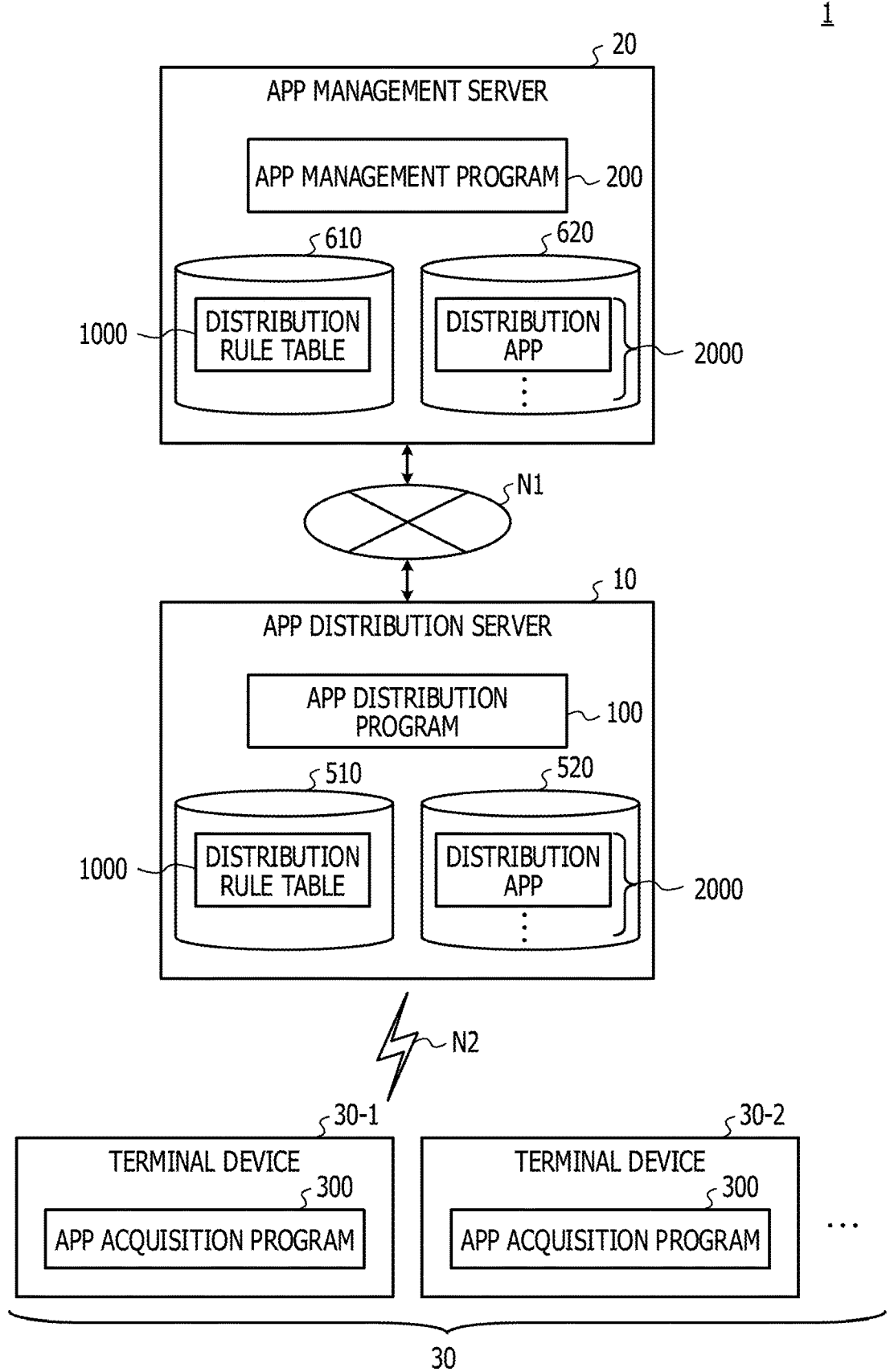
FIG. 1 is a diagram illustrating an example of an entire configuration of an app distribution system according to a first embodiment.

First, an entire configuration of an app distribution system 1 according to a first embodiment will be described with reference to FIG. 1. FIG. 1 is a diagram illustrating an example of an entire configuration of the app distribution system 1 according to the first embodiment.

As illustrated in FIG. 1, the app distribution system 1 according to this embodiment includes an app distribution server 10, an app management server 20, and one or more terminal devices 30.

The app distribution server 10 and the app management server 20 perform a communication with one another via a wide-area network N1, such as, for example, the Internet, a telephone line network, or the like. The app distribution server 10 and the terminal device 30 perform a communication with one another via a local network N2 using, for example, a wireless local area network (LAN), a short-range wireless communication, or the like. Examples of the short-range wireless communication include Bluetooth (a registered trademark), ZigBee (registered trademark), radio frequency identifier (RFID), Bluetooth Low Energy (BLE), or the like.

The app distribution server 10 is a portable information processing device that provides an app distribution service. For example, the app distribution server 10 may be carried by a user and be installed in an arbitrary place. The user of the app distribution server 10 will be also referred to as an "app provider".

An app distribution program 100 has been installed in the app distribution server 10. The app distribution server 10 includes a distribution rule table storage unit 510 and a distribution app storage unit 520.

The app distribution server 10 acquires a distribution target application (which will be hereinafter also referred to as a "distribution app") 2000 and a distribution rule table 1000 in which an area in which the distribution app 2000 is distributed is defined from the app management server 20 in accordance with the app distribution program 100. Then, the app distribution server 10 stores the distribution rule table 1000 and the distribution app 2000 that have been acquired from the app management server 20 in the distribution rule table storage unit 510 and the distribution app storage unit 520, respectively, in accordance with the app distribution program 100.

When it is determined that the app distribution server 10 exists in the area that is defined in the distribution rule table 1000, the app distribution server 10 distributes the distribution app 2000 that corresponds to the area to the terminal device 30 in accordance with the app distribution program 100.

The app management server 20 is an information processing device that manages the distribution rule table 1000 and the distribution app 2000.

An app management program 200 has been installed in the app management server 20. The app management server 20 includes the distribution rule table storage unit 510 and the distribution app storage unit 520.

The app management server 20 transmits the distribution rule table 1000 that has been stored in the distribution rule table storage unit 510 and the distribution app 2000 that has been stored in the distribution app storage unit 520 to the app distribution server 10 in accordance with the app management program 200.

The terminal device 30 is an information processing device, such as a smartphone, a mobile phone, a tablet terminal, a personal digital assistant (PDA), or the like, which is used by a user. The terminal device 30 may be a wearable device, such as, for example, a head mounted display (HMD), a face mounted display (FMD), a wrist watch type terminal, an eyeglass type terminal, or the like. A user of the terminal device 30 will be also referred to as an "app user". However, the app provider and the app user are distinguished from one another merely for convenience purposes, and the app provider and the app user may be the same person.

An app acquisition program 300 has been installed in the terminal device 30. The terminal device 30 acquires the distribution app 2000 that has been distributed from the app distribution server 10 in accordance with the app acquisition program 300. In the following description, for the plurality of the terminal devices 30, when the terminal devices 30 are distinguished from one another, the terminal devices 30 will be described as a "terminal device 30-1", a "terminal device 30-2", a "terminal device 30-3", or the like. The terminal devices 30 may be configured to also perform a communication with another device via the network N1.

As described above, the app distribution system 1 according to this embodiment includes the potable app distribution server 10. Then, in the app distribution system 1 according to this embodiment, when the portable app distribution server 10 exists in a certain area (that is, when the app distribution server 10 has been installed in the certain area), the distribution app 2000 that corresponds to the area is distributed to the terminal device 30 via the network N2.

The certain area in which the app distribution server 10 distributes the distribution app 2000 will be also referred to as a "place". An entrance of the app distribution server 10 in the place (that is, installation or the like of the app distribution server 10 in the certain area) will be also referred to as "check-in" and an exit of the app distribution server 10 from the place will be also referred to as "check-out".

Figure 2:
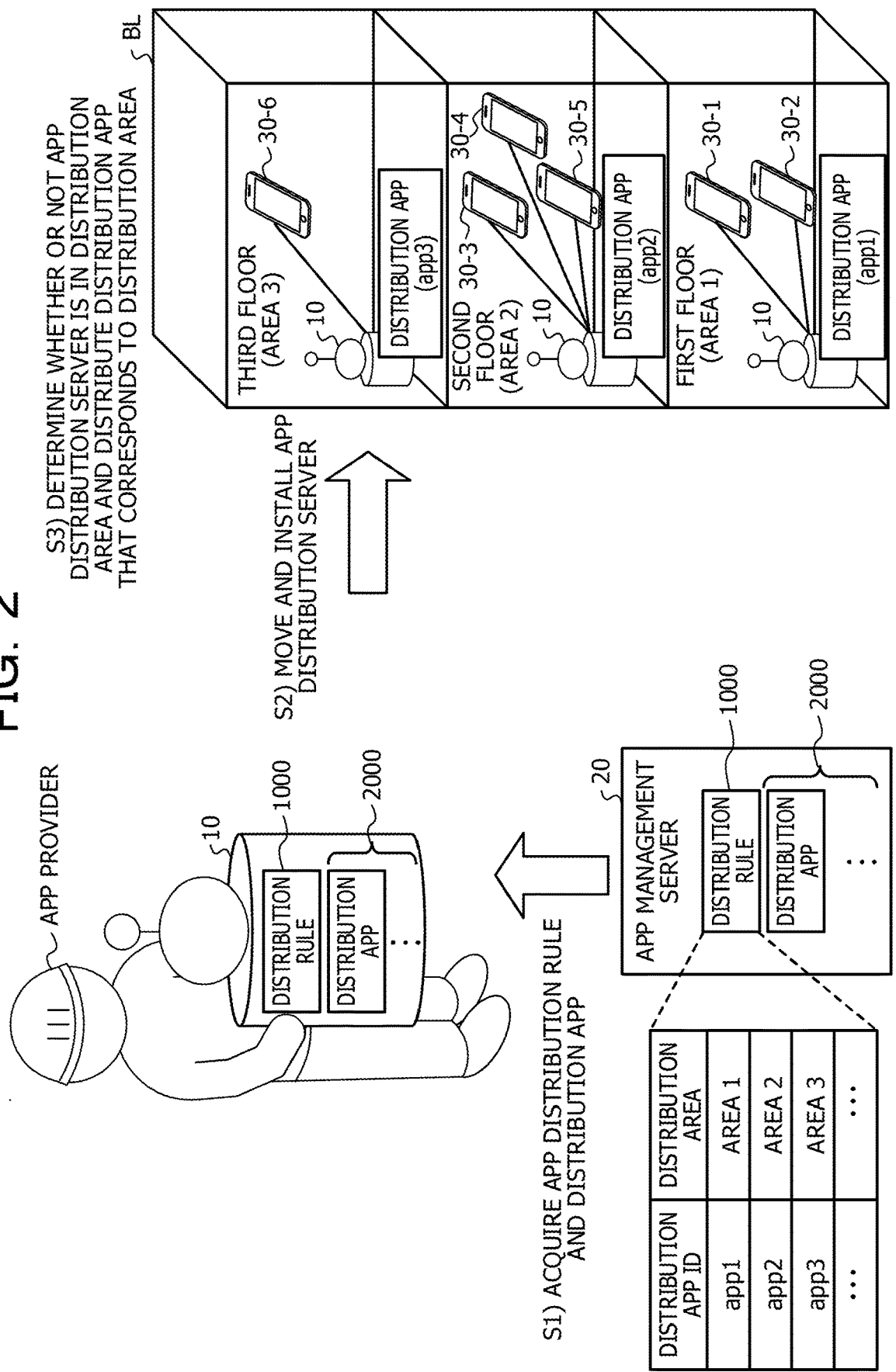
FIG. 2 is a diagram illustrating an example of an outline of an app distribution system according to the first embodiment.

An outline of processing of the app distribution system 1 according to this embodiment will be described below with reference to FIG. 2. FIG. 2 is a diagram illustrating an example of an outline of processing of the app distribution system 1 according to the first embodiment.

S1) The app distribution server 10 acquires the distribution rule table 1000 and the distribution app 2000 from the app management server 20. In this case, in the distribution rule table 1000, for example, a distribution app ID that identifies the distribution app 2000 and an area (a distribution area) in which the distribution app 2000 of the distribution ID is distributed are associated with one another.

S2) The app provider moves the app distribution server 10 to an arbitrary place, for example, in a building BL and installs the app distribution server 10 in the arbitrary place.

S3) The app distribution server 10 refers to the distribution rule table 1000 and determines whether or not the app distribution server 10 is in the distribution area. Then, if the app distribution server 10 has determined that the app distribution server 10 is in the distribution area, the app distribution server 10 refers to the distribution rule table 1000 and distributes the distribution app 2000 that corresponds to the distribution area to the terminal device 30 that is communicable via the network N2.

That is, for example, if the app distribution server 10 has been installed in a first floor (a distribution area "AREA1") in the building BL, the app distribution server 10 determines that the app distribution server 10 is in the distribution area "AREA1". Then, the app distribution server 10 distributes the distribution app 2000 (for example, an application that provides a function for the first floor) of a distribution app ID "app1" that corresponds to the distribution area "AREA1" to the terminal device 30-1 and the terminal device 30-2 that are communicable via the network N2. Thus, the terminal device 30-1 and the terminal device 30-2 are enabled to use the distribution app 2000 of the distribution ID "app1".

Similarly, for example, if the app distribution server 10 has been installed in a second floor (a distribution area "AREA2") in the building BL, the app distribution server 10 determines that the app distribution server 10 is in the distribution area "AREA2". Then, the app distribution server 10 distributes the distribution app 2000 (for example, an application that provides a function for the second floor) of a distribution app ID "app2" that corresponds to the distribution area "AREA2" to the terminal devices 30-3 to 30-5 that are communicable via the network N2. Thus, the terminal devices 30-3 to 30-5 are enabled to use the distribution app 2000 of the distribution ID "app2".

Similarly, for example, if the app distribution server 10 has been installed in a third floor (a distribution area "AREA3") in the building BL, the app distribution server 10 determines that the app distribution server 10 is in the distribution area "AREA3". Then, the app distribution server 10 distributes the distribution app 2000 (for example, an application that provides a function for the third floor) of a distribution app ID "app3" that corresponds to the distribution area "AREA3" to the terminal device 30-6 that is communicable via the network N2. Thus, the terminal device 30-6 is enabled to use the distribution app 2000 of the distribution ID "app3".

As described above, the app distribution system 1 according to this embodiment distributes the distribution app 2000 that corresponds to an area in which the app distribution server 10 has been installed or the like to the terminal device 30 that is communicable with the app distribution server 10.

Therefore, in the app distribution system 1 according to this embodiment, even when the user of the terminal device 30 is, for example, in a building or a tunnel in which the user is not able to receive a radio wave from a GPS satellite, the distribution app 2000 may be distributed to the terminal device 30 of the user. In other words, using the app distribution system 1 according to this embodiment, even when the user is in an area, for example, in a building, a tunnel, or the like, the user of the terminal device 30 is able to use an app distribution service.

In the app distribution system 1 according to this embodiment, for example, even when the terminal device 30 does not include a GPS receiver or the like, the distribution app 2000 may be distributed to the terminal device 30.

Figure 3:
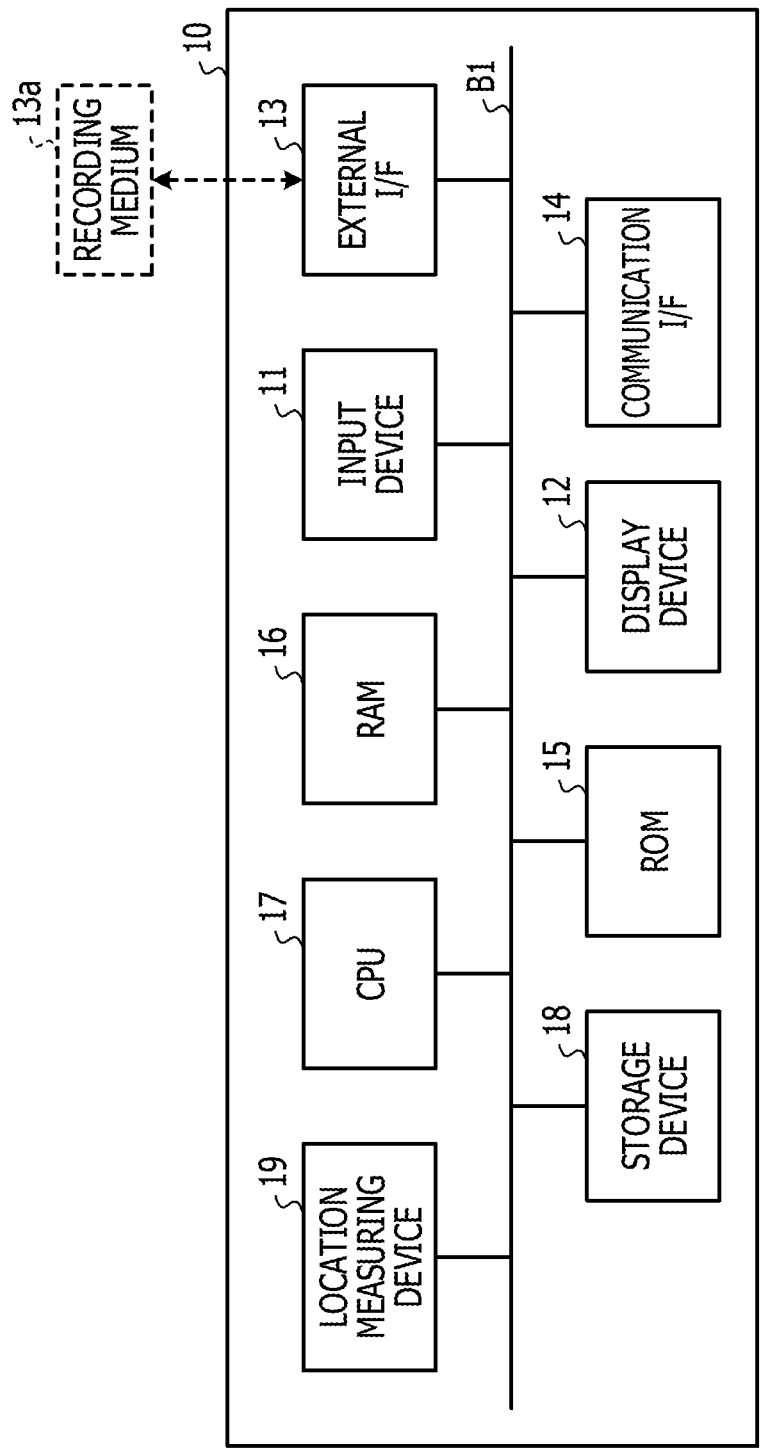
FIG. 3 is a diagram illustrating an example of a hardware configuration of an app distribution server according to the first embodiment.

Next, a hardware configuration of the app distribution server 10 according to this embodiment will be described with reference to FIG. 3. FIG. 3 is a diagram illustrating an example of a hardware configuration of the app distribution server 10 according to the first embodiment.

As illustrated in FIG. 3, the app distribution server 10 according to this embodiment includes an input device 11, a display device 12, an external I/F 13, a communication I/F 14, and a read only memory (ROM) 15. The app distribution server 10 according to this embodiment includes a random access memory (RAM) 16, a central processing unit (CPU) 17, a storage unit 18, and a location measuring device 19. These hardware components are mutually coupled to one another via a bus B1.

The input device 11 is, for example, one of various buttons, a touch panel, or the like, and is used for inputting operation signals of various types to the app distribution server 10. The display device 12 is, for example, a display or the like, and displays a result of processing of various types, which have been performed by the app distribution server 10. The app distribution server 10 may be configured not to include at least one of the input device 11 and the display device 12.

The external I/F 13 is an interface with an external device. Examples of the external device include a recording medium 13*a* or the like. The app distribution server 10 is able to perform read from and/or write to the recording medium 13*a* via the external I/F 13.

Examples of the recording medium 13*a* include, for example, a SD memory card, a USB memory, a compact disk (CD), a digital versatile disk (DVD), or the like.

The communication I/F 14 is an interface that couples the app distribution server 10 to the network N1 or the network N2. The app distribution server 10 is able to perform a communication with the app management server 20 or the terminal device 30 via the communication I/F 14.

The ROM 15 is a nonvolatile semiconductor memory that is able to hold data even after power is turned off. The RAM 16 is a volatile semiconductor memory that temporarily holds a program or data. The CPU 17 is an arithmetic device that reads a program or data, for example, from the storage unit 18, the ROM 15, or the like onto the RAM 16 and executes various types of processing.

The storage unit 18 is, for example, a hard disk drive (HDD), a solid state drive (SSD), or the like, and is a nonvolatile memory that stores a program or data. Examples of programs or data stored in the storage unit 18 include the app distribution program 100, an operating system (OS) that is a basic software, various types of applications, or the like.

The location measuring device 19 is a device that includes, for example, an acceleration sensor, a gyrosensor, a magnetic field sensor, or the like, and measures location information of the app distribution server 10 by a self-contained navigation (or an inertial navigation) or the like. That is, the location measuring device 19 is a device that is able to measure location information that indicates the current location of the app distribution server 10 even in, for example, a building, a tunnel, or the like in which a radio wave from a GPS satellite is not received or is hard to be received.

The app distribution server 10 according to this embodiment has the hardware configuration illustrated in FIG. 3, and thereby, various types of processing that will be described later are realized.

Figure 4:
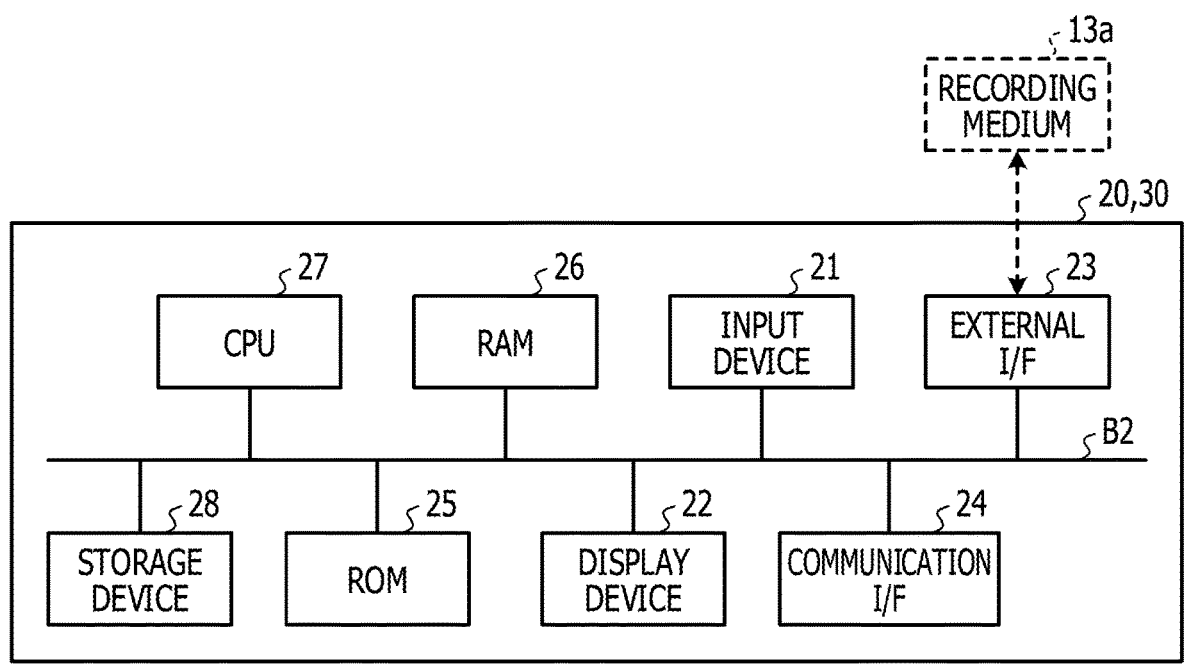
FIG. 4 is a diagram illustrating an example of a hardware configuration of an app management server and a terminal device according to the first embodiment.

Next, a hardware configuration of the app management server 20 and the terminal device 30 according to this embodiment will be described with reference to FIG. 4. FIG. 4 is a diagram illustrating an example of a hardware configuration of the app management server 20 and the terminal device 30 according to the first embodiment. The app management server 20 and the terminal device 30 have similar hardware configurations to one another, and therefore, a hardware configuration of the app management server 20 will be mainly described below.

As illustrated in FIG. 4, the app management server 20 according to this embodiment includes an input device 21, a display device 22, an external I/F 23, and a communication I/F 24. The app management server 20 according to this embodiment includes a ROM 25, a RAM 26, a CPU 27, and a storage device 28. Each of these hardware components are mutually coupled to one another via a bus B2.

The input device 21 is a keyboard, a mouse, a touch panel, or the like and is used for inputting operation signals of various types to the app management server 20. As the input device 21 of the terminal device 30, for example, a touch panel or the like is used.

The display device 22 is, for example, a display or the like, and displays a result of processing of various types, which have been performed by the app management server 20. The app management server 20 may be configured not to include at least one of the input device 21 and the display device 22.

The external I/F 23 is an interface with an external device. Examples of the external device include a recording medium 23a or the like. The app management server 20 is able to perform read from and/or write to the recording medium 23a via the external I/F 23.

Examples of the recording medium 23a include, for example, a SD memory card, a USB memory, a CD, a DVD, or the like.

The communication I/F 24 is an interface that couples the app management server 20 to the network N1. The app management server 20 is able to perform a communication with the app distribution server 10 via the communication I/F 24. The communication I/F 24 of the terminal device 30 is an interface that couples to the network N2.

The ROM 25 is a nonvolatile semiconductor memory that is able to hold data even after power is turned off. The RAM 26 is a volatile semiconductor memory that temporarily holds a program or data. The CPU 27 is an arithmetic device that reads a program or data, for example, from the storage unit 28, the ROM 25, or the like onto the RAM 26 and executes various types of processing.

The storage unit 28 is, for example, a HDD, a SSD, or the like, and is a nonvolatile memory that stores a program or data. Examples of programs or data stored in the storage unit 28 include the app management program 200, an OS that is a basic software, various types of applications, or the like. Examples of programs or data stored in the storage unit 28 of the terminal device 30 include an app acquisition program 300 or the like.

The terminal device 30 may be configured to include, in addition to each of the above-described hardware components, for example, a GPS receiver or the like.

Each of the app management server 20 and the terminal device 30 according to this embodiment has the hardware configuration illustrated in FIG. 4, and thereby, various types of processing that will be described later are realized.

Figure 5:
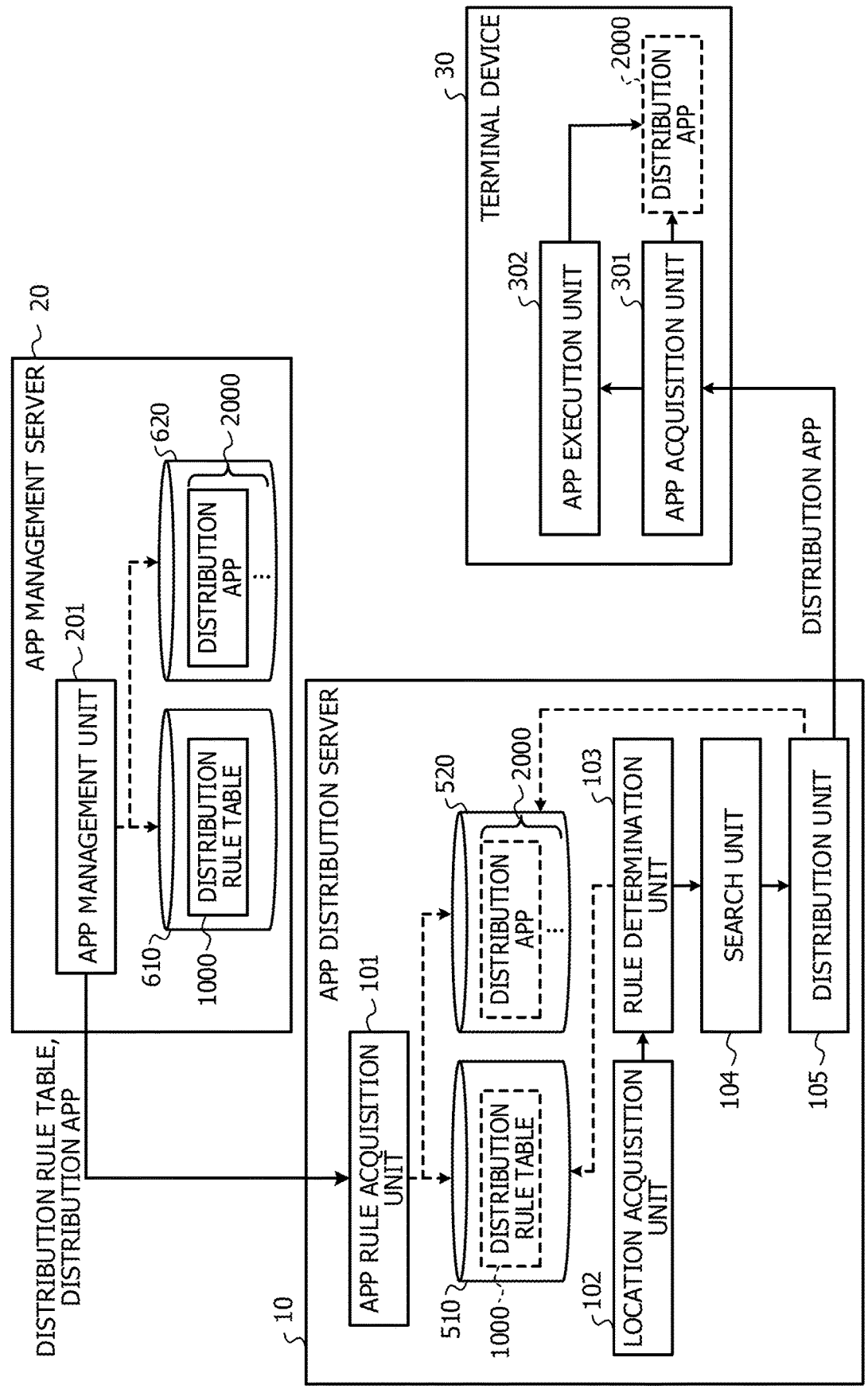
FIG. 5 is a diagram illustrating an example of a functional configuration of an app distribution system according to the first embodiment.

Next, a functional configuration of the app distribution system 1 according to this embodiment will be described with reference to FIG. 5. FIG. 5 is a diagram illustrating an example of a functional configuration of the app distribution system 1 according to the first embodiment.

As illustrated in FIG. 5, the app distribution server 10 according to this embodiment includes an app rule acquisition unit 101, a location acquisition unit 102, a rule determination unit 103, a search unit 104, and a distribution unit 105. Each of these function units is realized by processing that the app distribution program 100 installed in the app distribution server 10 causes the CPU 17 to execute.

The app distribution server 10 according to this embodiment includes the distribution rule table storage unit 510 and the distribution app storage unit 520. Each of these storage units may be realized, for example, by the storage unit 18.

The app rule acquisition unit 101 acquires the distribution rule table 1000 and the distribution app 2000 from the app management server 20. Then, the app rule acquisition unit 101 stores the distribution rule table 1000 and the distribution app 2000 that have been acquired in the distribution rule table storage unit 510 and the distribution app storage unit 520, respectively.

The location acquisition unit 102 acquires location information (information that indicates the current location of the app distribution server 10) which has been measured by the location measuring device 19.

The rule determination unit 103 refers to the distribution rule table 1000 that has been stored in the distribution rule table storage unit 510 and determines whether or not the current location (a location indicated by the location information that has been acquired by the location acquisition unit 102) of the app distribution server 10 is included in a distribution area. That is, the rule determination unit 103 determines whether or not the app distribution server 10 has been installed in the distribution area that is defined in the distribution rule table 1000.

If it has been determined by the rule determination unit 103 that the current location of the app distribution server 10 is included in the distribution area, the search unit 104 searches the terminal device 30 that is communicable via the network N2.

The distribution unit 105 refers to the distribution rule table 1000 and acquires the distribution app 2000 that corresponds to the distribution area in which it has been determined by the rule determination unit 103 that the app distribution server 10 had been installed from the distribution app storage unit 520. Then, the distribution unit 105 distributes the distribution app 2000 acquired from the distribution app storage unit 520 to the terminal device 30 that has been search by the search unit 104.

The distribution rule table storage unit 510 stores the distribution rule table 1000 that has been acquired by the app rule acquisition unit 101. The distribution app storage unit 520 stores one or more distribution apps 2000 that have been acquired by the app rule acquisition unit 101. Details of the distribution rule table 1000 will be described later.

As illustrated in FIG. 5, the app management server 20 according to this embodiment includes an app management unit 201. This function unit is realized by processing that the app management program 200 that has been installed in the app management server 20 causes the CPU 27 to execute.

The app management server 20 according to this embodiment includes a distribution rule table storage unit 610 and a distribution app storage unit 620. Each of these storage units may be realized by, for example, the storage device 28. At least one of these storage units may be realized using a storage device or the like, which is coupled to the app management server 20 via the network N1.

The app management unit 201 manages the distribution rule table 1000 stored in the distribution rule table storage unit 610 and one or more distribution apps 2000 stored in the distribution app storage unit 620. The app management unit 201 sends back the distribution rule table 1000 and the distribution app 2000 to the app distribution server 10 in accordance with a request (an acquisition request for acquiring the distribution rule table 1000 and the distribution app 2000) from the app distribution server 10.

The distribution rule table storage unit 610 stores the distribution rule table 1000. The distribution app storage unit 620 stores the one or more distribution apps 2000.

Figure 6:
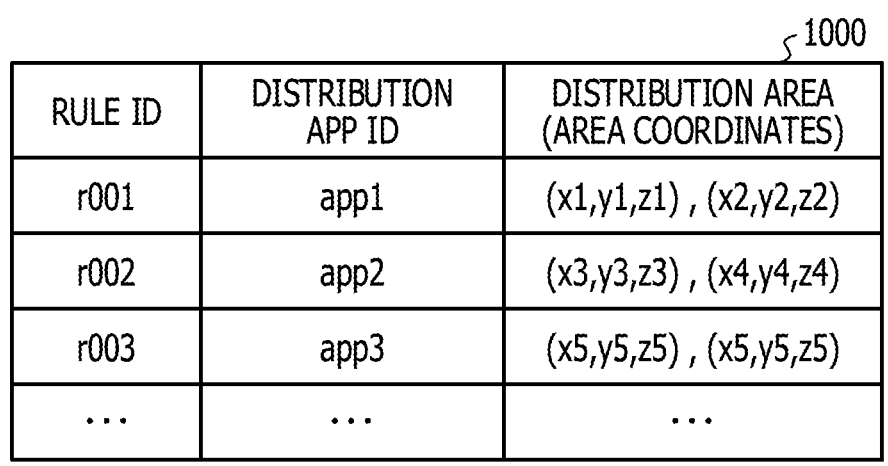
FIG. 6 is a table illustrating an example of a distribution rule table according to the first embodiment.

The distribution rule table 1000 will be described below with reference to FIG. 6. FIG. 6 is a table illustrating an example of the distribution rule table 1000 according to the first embodiment.

As illustrated in FIG. 6, the distribution rule table 1000 includes, as data items, a rule ID, a distribution app ID, and a distribution area (area coordinates).

The rule ID is identification information that identifies one row (record) included in the distribution rule table 1000. One row (record) included in the distribution rule table 1000 will be hereinafter also referred to as a "distribution rule". In the distribution rule table 1000 illustrated in FIG. 6, a distribution rule of a rule ID "r001", a distribution rule of a rule ID "r002", a distribution rule of a rule ID "r003", and the like are stored.

The distribution app ID is identification information that identifies the distribution app 2000. For the distribution area (area coordinates), an area in which the distribution app 2000 that is identified by the distribution ID is distributed is defined by a latitude, a longitude, and an altitude (a height).

For example, for the distribution rule of the rule ID "r001", a distribution area "(x1, y1, z1), (x2, y2, z2)" is defined. This indicates, for example, that a rectangular parallelepiped having a straight line connecting from a point (x1, y1, z1) and a point (x2, y2, z2) as a diagonal line is defined as a distribution area.

Similarly, for the distribution rule of the rule ID "r002", a distribution area "(x3, y3, z3), (x4 y4, z4)" is defined. This indicates, for example, that a rectangular parallelepiped having a straight line connecting from a point (x3, y3, z3) and a point (x4, y4, z4) as a diagonal line is defined as a distribution area.

As described above, in the distribution rule table 1000, the distribution rule in which the distribution app ID that indicates the distribution app 2000 and a distribution area in which the distribution app 2000 is distributed are associated with one another is stored. The distribution rule table 1000 is generated in advance, for example, by a user (which will be hereinafter also referred to as an "app administrator") of the app management server 20.

As the distribution area (area coordinates) of the distribution rule table 1000 illustrated in FIG. 6, a rectangular parallelepiped having a straight line connecting two points as a diagonal line is defined, but the distribution area is not limited to an area defined by a rectangular parallelepiped. As the distribution area, an arbitrary area, such as, for example, an area defined by a sphere, an area defined by an ellipsoid, or the like, may be defined. The distribution area may be, for example, the inside of a specific building, the inside of a specific room in a specific building, an administrative district or the like, such as a city, a town, a village, or the like, a certain range from a specific point, or the like. As described above, for the distribution area of the distribution rule table 1000, a range that may be spatially specified may be defined as a distribution area.

As illustrated in FIG. 5, the terminal device 30 according to this embodiment includes an app acquisition unit 301 and an app execution unit 302. Each of these function units is realized by processing that the app acquisition program 300 that has been installed in the terminal device 30 causes the CPU 27 to execute.

The app acquisition unit 301 acquires the distribution app 2000 that has been distributed by the app distribution server 10.

The app execution unit 302 executes the distribution app 2000 that has been acquired by the app acquisition unit 301.

Figure 7:
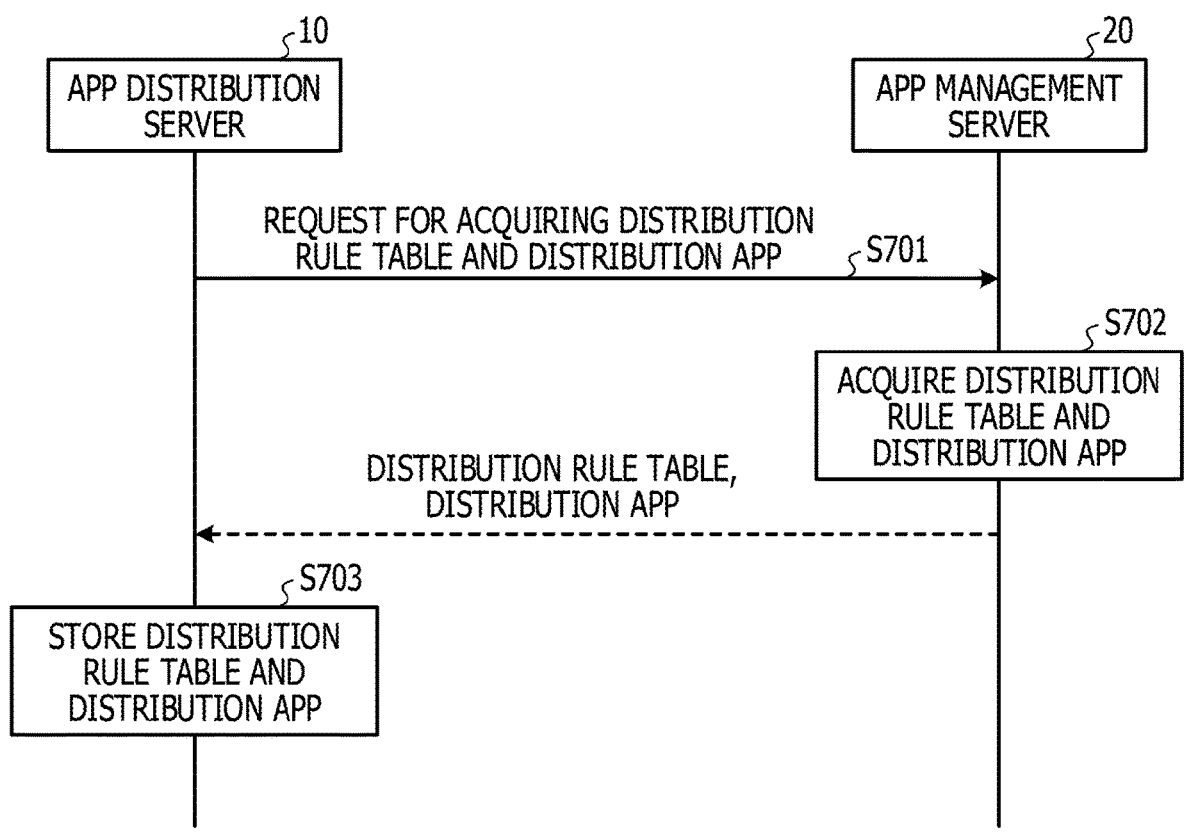
FIG. 7 is a sequence diagram illustrating an example of acquisition processing of acquiring a distribution rule table and a distribution app according to the first embodiment.

Next, details of processing of the app distribution system 1 according to this embodiment will be described. First, processing in which the app distribution server 10 acquires the distribution rule table 1000 and the distribution app 2000 from the app management server 20 will be described with reference to FIG. 7. FIG. 7 is a sequence diagram illustrating an example of acquisition processing of acquiring a distribution rule table and a distribution app according to the first embodiment.

First, the app rule acquisition unit 101 of the app distribution server 10 transmits an acquisition request for acquiring the distribution rule table 1000 and the distribution app 2000 to the app management server 20 (S701).

The app rule acquisition unit 101 may be configured to, for example, transmit an acquisition request for acquiring the distribution rule table 1000 and the distribution app 2000 to the app management server 20 in accordance with an operation that is performed by the app provider. The app rule acquisition unit 101 may be also configured to transmit, for example, when it is detected that a communication with the app management server 20 via the network N1 is possible, an acquisition request for acquiring the distribution rule table 1000 and the distribution app 2000 to the app management server 20.

When the app management unit 201 of the app management server 20 receives the acquisition request for acquiring the distribution rule table 1000 and the distribution app 2000, the app management unit 201 acquires the distribution rule table 1000 from the distribution rule table storage unit 610. The app management unit 201 acquires the distribution app 2000 from the distribution app storage unit 620 (S702).

Then, the app management unit 201 sends back the distribution rule table 1000 and the distribution app 2000 that have been acquired to the app distribution server 10.

When the app rule acquisition unit 101 of the app distribution server 10 receives the distribution rule table 1000 and the distribution app 2000, the app rule acquisition unit 101 stores the distribution rule table 1000 in the distribution rule table storage unit 510. The app rule acquisition unit 101 stores the distribution app 2000 in the distribution app storage unit 520 (S703).

The app rule acquisition unit 101 may be configured to delete, if the distribution rule table 1000 has been already stored in the distribution rule table storage unit 510, the distribution rule table 1000, and then, store the distribution rule table 1000 that has been received in S703. Similarly, the app rule acquisition unit 101 may be configured to delete, if the distribution app 2000 has been already stored in the distribution app storage unit 520, the distribution app 2000, and then, store the distribution app 2000 that has been received in S703.

As has been described above, in the app distribution system 1 according to this embodiment, the distribution rule table 1000 and the distribution app 2000 that have been acquired from the app management server 20 are stored in the portable app distribution server 10. Thus, the app provider is able to carry the app distribution server 10 in which the distribution rule table 1000 and the distribution app 2000 have been stored and install the app distribution server 10 in a desired place.

Accordingly, in the app distribution system 1 according to this embodiment, the app distribution server 10 may be installed in a place (for example, a construction site in a tunnel, a mountain region, or the like, a construction site of a subway, or the like) in which it is not possible to connect to the network N1. In this case, for example, when an update of the distribution rule table 1000 and the distribution app 2000 is to be performed, the app provider may carry the app distribution server 10 to a place in which it is possible to connect to N1.

The app provider may move carrying the app distribution server 10 in which the distribution rule table 1000 and the distribution app 2000 have been stored, not install the app distribution server 10 in a specific place.

Figure 8:
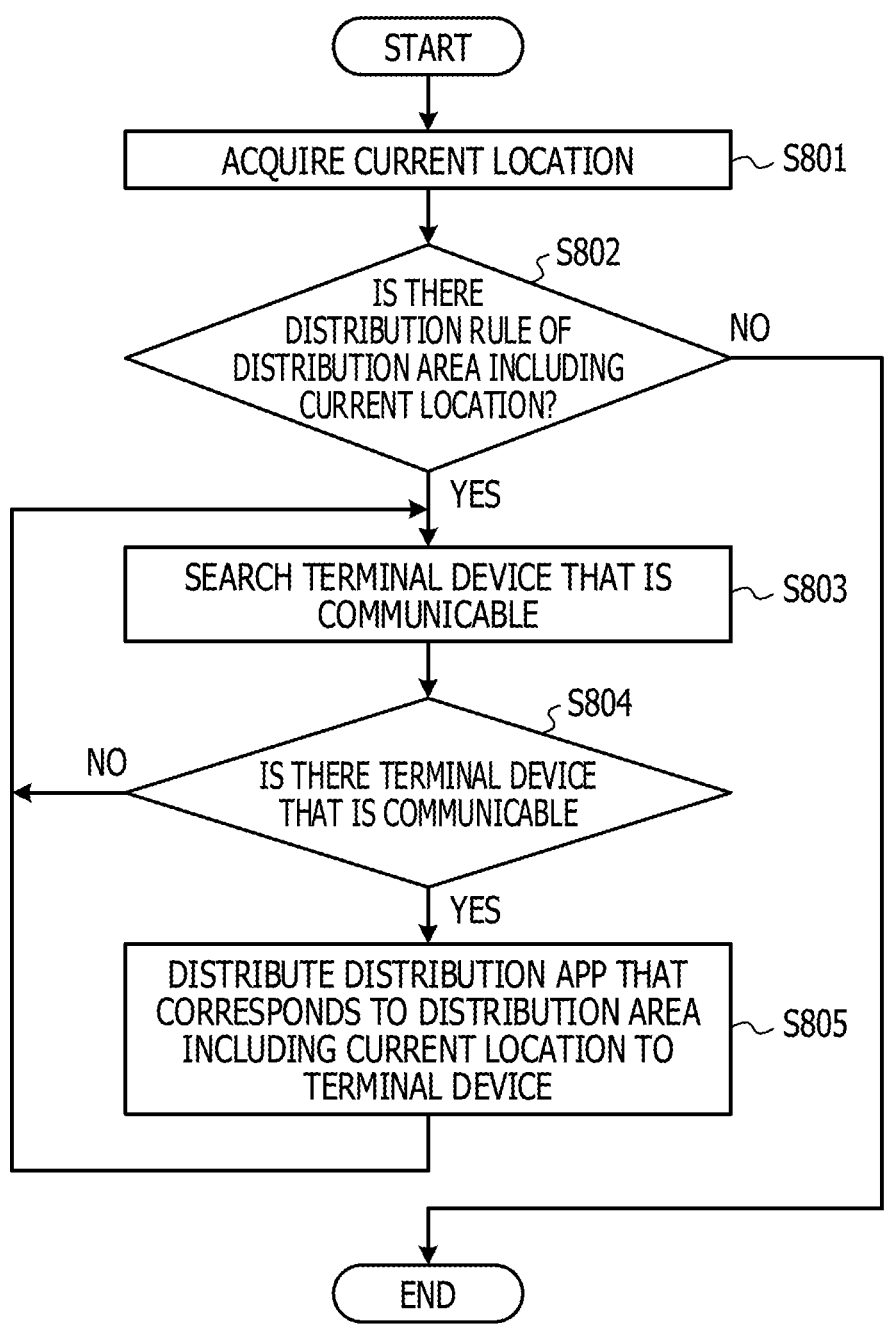
FIG. 8 is a flowchart illustrating an example of distribution processing of distributing a distribution app in an app distribution server according to the first embodiment.

Next, processing in which, after the app provider has installed the app distribution server 10 in the desired place, the app distribution server 10 distributes the distribution app 2000 to the terminal device 30 will be described with reference to FIG. 8. FIG. 8 is a flowchart illustrating an example of distribution processing of distributing a distribution app in the app distribution server 10 according to the first embodiment. Distribution processing of distributing a distribution app, which is illustrated in FIG. 8, may be executed, for example, each time location information is measured by the location measuring device 19, or in accordance with an operation (an operation of starting distribution of an app, or the like) of the app provider.

First, the location acquisition unit 102 acquires location information (information that indicates the current location of the app distribution server 10) which has been measured by the location measuring device 19 (S801).

Next, the rule determination unit 103 refers to the distribution rule table 1000 stored in the distribution rule table storage unit 510 and determines whether or not there is a distribution rule in which a distribution area including the current location of the app distribution server 10 is defined (S802). That is, the rule determination unit 103 determines whether or not there is a distribution rule in which a distribution area including an installation location of the app distribution server 10 is defined, among the distribution rules stored in the distribution rule table 1000.

In S802, if it has been determined that there is a distribution rule in which a distribution area including the current location is defined, the search unit 104 searches the terminal device 30 that is communicable via the network N2 (S803).

For example, the search unit 104 may be configured to transmit, when a communication using a wireless LAN as the network N2 is performed, a beacon signal to a surrounding. In this case, the search unit 104 is able to search the terminal device 30 that is communicable via the network N2 by receiving a response to the beacon signal from the terminal device 30.

For example, the search unit 104 may be configured to transmit, when a communication using a BLE as the network N2 is performed, an advertising packet to a surrounding. In this case, the search unit 104 is able to search the terminal device 30 that is communicable via the network N2 by receiving a response to the advertising packet from the terminal device 30.

Next, the search unit 104 determines whether or not one or more terminal devices 30 that are communicable via the network N2 have been searched (S804).

In S804, if the one or more terminal devices 30 that are communicable via the network N2 have been searched by the search unit 104, the distribution unit 105 distributes the distribution app 2000 that corresponds to a distribution area to the one or more terminal devices 30 that have been searched (S805).

That is, the distribution unit 105 refers to the distribution rule table 1000 and acquires the distribution app 2000 of the distribution app ID that corresponds to the distribution area that has been determined to include the current location of the app distribution server 10 from the distribution app storage unit 520. Then, the distribution unit 105 distributes the acquired distribution app 2000 to the one or more terminal devices 30 that have been searched.

Thus, the application 2000 that corresponds to the area in which the app distribution server 10 has been installed or the like is distributed to the terminal device 30 (that is, the terminal device 30 located in the same area as the app distribution server 10 is located) around the app distribution server 10.

On the other hand, in S804, if the terminal device 30 that is communicable via the network N2 has not been searched by the search unit 104, the app distribution server 10 causes the process to return to processing of S803. In this case, for example, after a certain time has elapsed, the search unit 104 performs processing of S803 and searches the terminal device 30 that is communicable via the network N2 again.

In S802, if it has been determined that there is not the distribution rule in which the distribution area including the current location is defined, the app distribution server 10 terminates processing. In this case, the app distribution server 10 is not installed or the like in the distribution area, and therefore, distribution of the distribution app 2000 is not performed.

As has been described, in the app distribution system 1 according to this embodiment, the app provider is able to install the portable app distribution server 10 in a desired place. Then, the app distribution server 10 according to this embodiment distributes the application 2000 that corresponds to the place (area) in which the app distribution server 10 has been installed to the terminal device 30 that is communicable via the network N2.

Thus, in the app distribution system 1 according to this embodiment, for example, also in an area (in a building, in a tunnel, or the like) in which the terminal device 30 is not able to acquire the current location using a GPS receiver or the like, the application 2000 that corresponds to the area may be distributed. In the app distribution system 1 according to this embodiment, for example, also in a case in which the terminal device 30 does not include a sensor or the like, such as a GPS receiver or the like, which acquires the current location, the application 2000 may be distributed. Furthermore, in the app distribution system 1 according to this embodiment, the terminal device 30 is able to acquire the current location without using a GPS receiver or the like, and therefore, power consumption of the terminal device 30 may be reduced.

In S804 of FIG. 8, the distribution app 2000 that corresponds to the distribution area that has been determined to include the current location of the app distribution server 10 is distributed to the terminal device 30, but the distribution app 2000 may be distributed, for example, such that, in accordance with time, the distribution app 2000 differs. That is, the distribution unit 105 may be configured to refer to, for example, a distribution rule table 1000A illustrated in FIG. 9 and distribute the distribution area that has been determined to include the current location of the app distribution server 10 and the distribution app 2000 that corresponds to a current time.

Thus, for example, when the current location of the app distribution server 10 is included in the distribution areas defined in the distribution rules of the rule IDs "r001" and "r002", the app distribution server 10 is able to distribute different applications 2000 in morning and afternoon. That is, if the current time is in the morning (0:00 to 11:59), the distribution unit 105 distributes the distribution app 2000 of the distribution app ID "app1". On the other hand, if the current time is in the afternoon (12:00 to 23:59), the distribution unit 105 distributes the distribution app 2000 of the distribution app ID "app9".

Thus, the app distribution server 10 according to this embodiment may be configured to distribute the application 20000 that corresponds to, in addition to the place (area) in which the app distribution server 10 has been installed, the current time to the terminal device 30 that is communicable via the network N2. The distribution rule table 1000A illustrated in FIG. 9 is acquired from the app management server 20 in acquisition processing of acquiring the distribution rule table and the distribution app, which is illustrated in FIG. 7.

Figure 10:
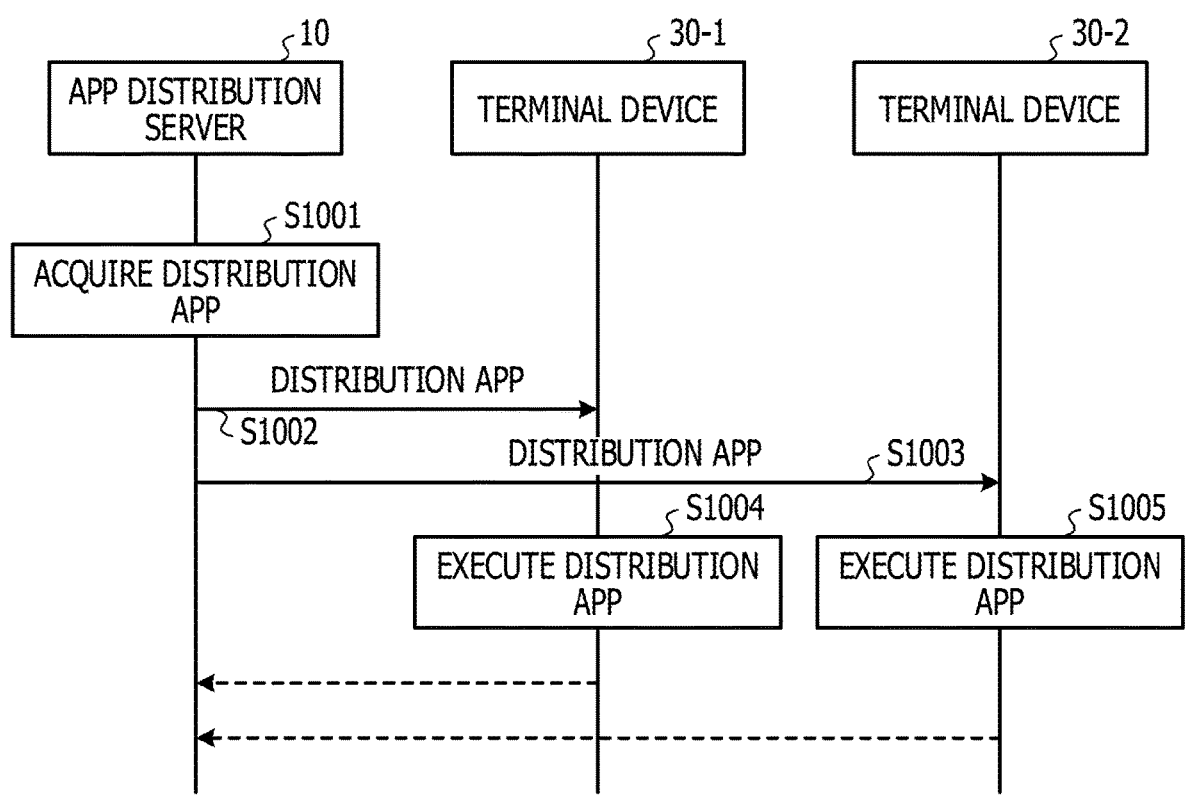
FIG. 10 is a sequence diagram illustrating an example of processing of distributing a distribution app to a terminal device according to the first embodiment.

Next, processing (processing of distributing the distribution app 2000 from the app distribution server 10 to the terminal device 30) in S805 of FIG. 8 will be described with reference to FIG. 10. FIG. 10 is a sequence diagram illustrating an example of processing of distributing a distribution app to the terminal device 30 according to the first embodiment. In FIG. 10, as an example, assuming that, in S803 of FIG. 8, the terminal device 30-1 and the terminal device 30-2 have been searched by the search unit 104, the description will be given.

First, the distribution unit 105 of the app distribution server 10 refers to the distribution rule table 1000 and acquires the distribution app 2000 of the distribution app ID that corresponds to the distribution area including the current location of the app distribution server 10 from the distribution app storage unit 520 (S1001).

Next, the distribution unit 105 of the app distribution server 10 distributes the distribution app 2000 that has been acquired from the distribution app storage unit 520 to the terminal device 30-1 and the terminal device 30-2 that have been searched by the search unit 104 (S1002 and S1003).

The app acquisition unit 301 of the terminal device 30-1 acquires the distribution app 2000 that has been distributed from the app distribution server 10. Then, the app execution unit 302 of the terminal device 30-1 executes the distribution app 2000 that has been acquired by the app acquisition unit 301 (S1004). The app execution unit 302 is able to execute the distribution app 2000, for example, by developing the distribution app 2000 that has been acquired by the app acquisition unit 301 on a memory (the RAM 16 or the like).

Similarly, the app acquisition unit 301 of the terminal device 30-2 acquires the distribution app 2000 that has been distributed from the app distribution server 10. Then, the app execution unit 302 of the terminal device 30-2 executes the distribution app 2000 that has been acquired by the app acquisition unit 301 (S1005).

Thus, users (app users) of the terminal device 30-1 and the terminal device 30-2 are enabled to use the application 2000 that has been distributed from the app distribution server 10. The app execution unit 302 may be configured to execute the distribution app 2000 that has been acquired from the app acquisition unit 301, for example, in accordance with an operation (an app start-up operation or the like) that is performed by an app user.

As has been described above, in the app distribution system 1 according to this embodiment, the terminal device 30 is able to use the distribution app 2000 (that is, the distribution app 2000 that corresponds to the places in which the app distribution server 10 and the terminal device 30 are located) that has been distributed from the app distribution server 10. Thus, also in an area (in a building, in a tunnel, or the like) in which the terminal device 30 is not able to acquire the current location using a GPS receiver or the like, the app user is able to use the application 2000 that corresponds to the area.

Second Embodiment

Next, a second embodiment will be described. In the second embodiment, an application 2000 that corresponds to, in addition to a place (area) in which an app distribution server 10 has been installed, a class (for example, a company to which a user of a terminal device 30 belongs, or the like) of the terminal device 30 located in the area is distributed. In the second embodiment, components with functions substantially identical to those in the first embodiment are identified by identical reference symbols and the description thereof will not be repeated.

Figure 11:
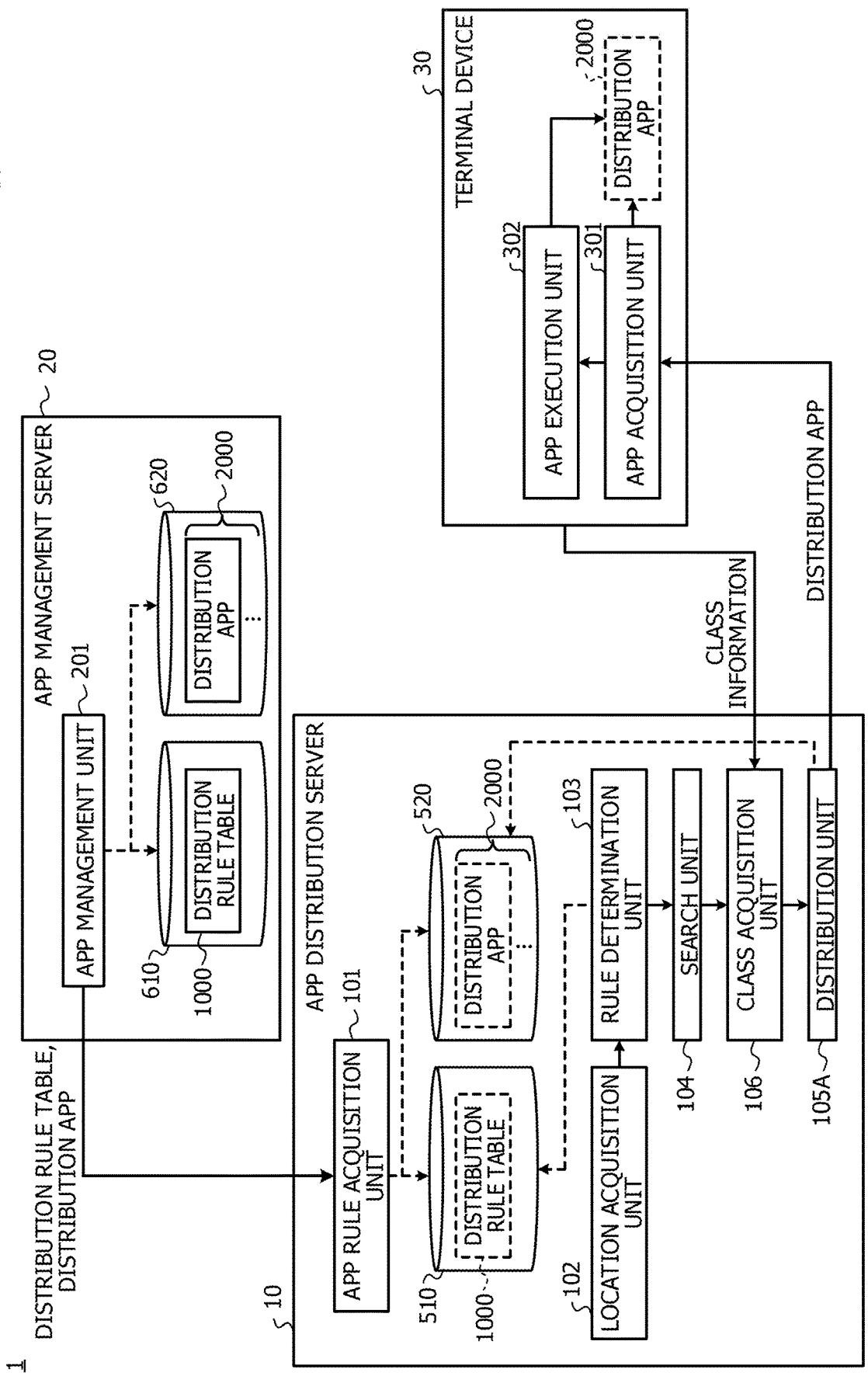
FIG. 11 is a diagram illustrating an example of a functional configuration of an app distribution system according to a second embodiment.

First, a functional configuration of the app distribution system 1 according to this embodiment will be described with reference to FIG. 11. FIG. 11 is a diagram illustrating an example of a functional configuration of the app distribution system 1 according to the second embodiment.

As illustrated in FIG. 11, the app distribution server 10 according to this embodiment includes a distribution unit 105A and a class acquisition unit 106. Each of these function units is realized by processing that an app distribution program 100 that has been installed in the app distribution server 10 causes a CPU 17 to execute.

The class acquisition unit 106 acquires class information from the terminal device 30 that has been searched by a search unit 104. The class information is information that indicates the class (for example, a company or the like to which the user of the terminal device 30 belongs) of the terminal device 30.

The distribution unit 105A refers to a distribution rule table 1000 that has been stored in a distribution rule table storage unit 510 and acquires a distribution app 2000 that corresponds to a distribution area in which the app distribution server 10 has been installed and a class that is indicated by the acquired class information from a distribution app storage unit 520. Then, the distribution unit 105A distributes the distribution app 2000 that has been acquired in accordance with the distribution area and the class to the terminal device 30 of the corresponding class, among the terminal devices 30 that have been searched by the search unit 104.

In this case, it is assumed that, in a distribution rule table storage unit 610 of an app management server 20 according to this embodiment, the distribution rule table 1000 has been stored. Therefore, in the distribution rule table storage unit 510 of the app distribution server 10 according to this embodiment, the distribution rule table 1000 is stored. The distribution rule table 1000 will be described with reference to FIG. 12. FIG. 12 is a table illustrating an example of the distribution rule table 1000 according to the second embodiment.

As illustrated in FIG. 12, the distribution rule table 1000 includes, as data items, a rule ID, a distribution app ID, a distribution area (area coordinates), and a class. Among the data items, the rule ID, the distribution app ID, and the distribution area (area coordinates) are similar to those in the distribution rule table 1000, which have been described in the first embodiment, and therefore, the description thereof will be omitted.

The class is information that is used for logically categorizing the terminal device 30 and is, for example, the company or the like to which the user of the terminal device 30 belongs. However, the class is not limited to the company to which the user of the terminal device 30 belongs and may be, for example, a department, a division, a section, a position, or the like in the company. The class may be, for example, sex, age (generation), birth month, or the like of the user of the terminal device 30.

Next, details of processing of the app distribution system 1 according to this embodiment will be described. Acquisition processing of acquiring a distribution rule table and a distribution app, which is illustrated in FIG. 7, and acquisition processing of distributing a distribution app to the terminal device 30, which is illustrated in FIG. 10, are similar to those in the first embodiment, and therefore, the description thereof will be omitted.

Figure 13:
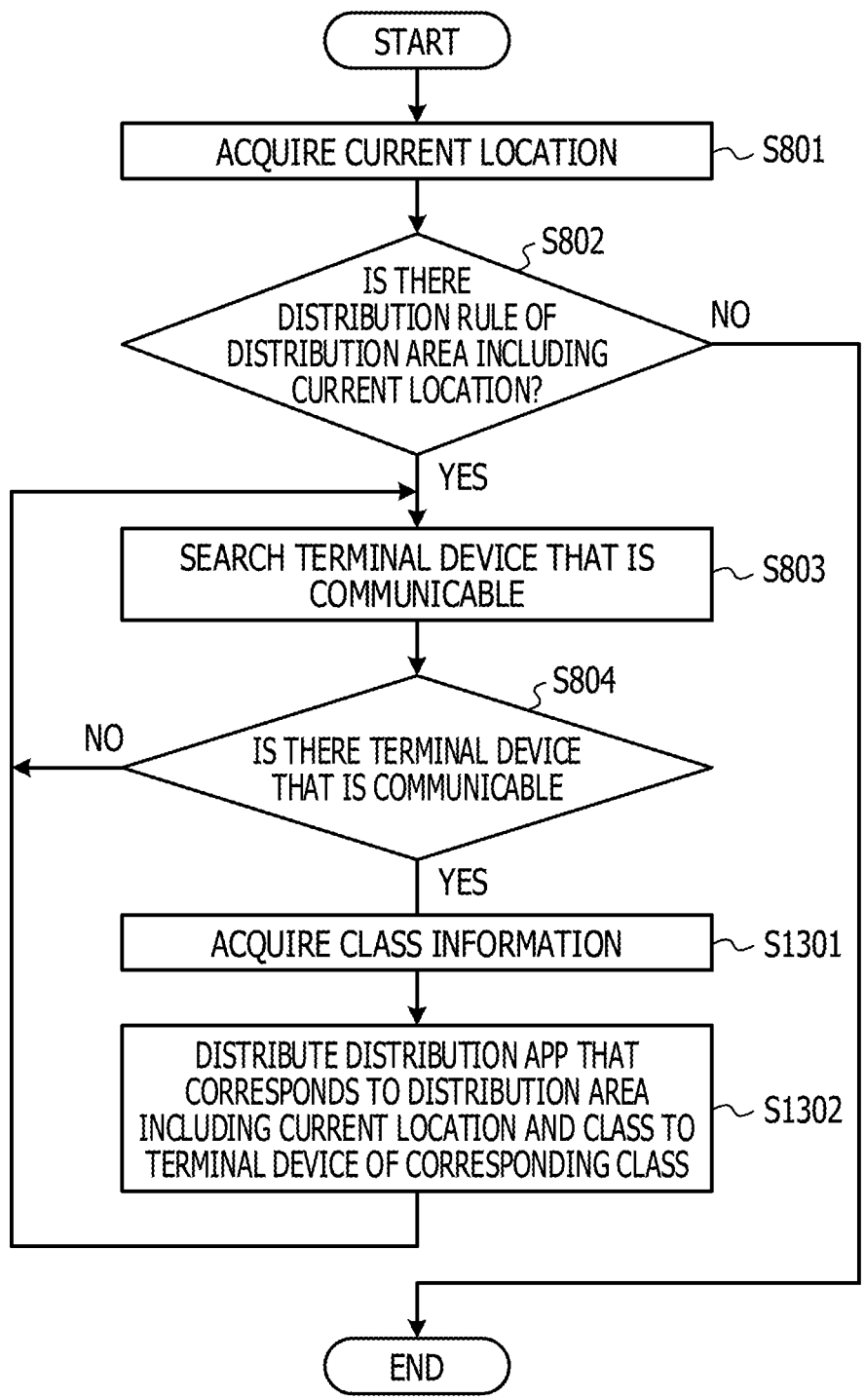
FIG. 13 is a flowchart illustrating an example of distribution processing of distributing a distribution app in an app distribution server according to the second embodiment.

Processing in which, after an app provider installs the app distribution server 10 in a desired place, the app distribution server 10 distributes the distribution app 2000 to the terminal device 30 will be described with reference to FIG. 13. FIG. 13 is a flowchart illustrating an example of distribution processing of distributing a distribution app in the app distribution server 10 according to the second embodiment. Processing of S801 to S804 of FIG. 13 is similar to processing of S801 to S804 of FIG. 8, which has been described in the first embodiment, and therefore, the description thereof will be omitted.

In S804, if one or more terminal devices 30 that are communicable via a network N2 have been searched by the search unit 104, the class acquisition unit 106 acquires the class information from the one or more terminal devices 30 that have been searched (S1301).

In this case, the class acquisition unit 106 may be configured to, for example, transmit an acquisition request for acquiring class information to each of the one or more terminal devices 30 that have been searched by the search unit 104 and acquire, as a response to the acquisition request, the class information. The class acquisition unit 106 may be configured to, for example, acquire the class information by referring to a certain table in which identification information (for example, the terminal ID, the physical address, or the like) which identifies the terminal device 30 that has been searched by the search unit 104 and the class information of the terminal device 30 are associated with one another.

Next, the distribution unit 105A distributes the distribution app 2000 that corresponds to the distribution area and the class to the terminal device 30 of the corresponding class, among the one or more terminal devices 30 that have been searched (S1302).

That is, the distribution unit 105A refers to the distribution rule table 1000 and acquires the distribution app 2000 of the distribution app ID that corresponds to the distribution area including the current location of the app distribution server 10 and the class that is indicated by the acquired class information from the distribution app storage unit 520. Then, the distribution unit 105A distributes the distribution app 2000 that has been acquired in accordance with the distribution area and the class to the terminal device 30 of the corresponding class, among the one or more terminal devices 30 that have been searched.

For example, it is assumed that the current location of the app distribution server 10 is included in a distribution area "(x1, y1, z1), (x2, y2, z2)". For example, in S1301 described above, the class acquisition unit 106 acquires class information that indicates a class "COMPANY A" from a terminal device 30-1 and also class information that indicates a class "COMPANY B" from a terminal device 30-2.

In this case, the distribution unit 105A refers to the distribution rule table 1000 illustrated in FIG. 12 and acquires the distribution app 2000 of a distribution app ID "app1" and the distribution app 2000 of a distribution app ID "app10" from the distribution app storage unit 520. Then, the distribution unit 105A distributes the distribution app 2000 of the distribution app ID "app1" to the terminal device 30-1 of the class "COMPANY A" and also the distribution app 2000 of the distribution app ID "app10" to the terminal device 30-2 of the class "COMPANY B".

As has been described above, in the app distribution system 1 according to this embodiment, the application 2000 that corresponds to the place (area) in which the app distribution server 10 has been installed and the class of the terminal device 30 located in the area to the terminal device 30 that is communicable via the network N2. Thus, in the app distribution system 1 according to this embodiment, it is possible to distribute a different application 2000 to, for example, even the terminal device 30 that is located in the same distribution area in accordance with the class (for example, the company or the like to which the app user belongs) of the terminal device 30.

Third Embodiment

Next, a third embodiment will be described. There are cases in which an app distribution server 10 is installed in a place (for example, a construction site in a tunnel, a mountain region, or the like, a construction site of a subway, or the like) in which it is not possible to connect to a network N1. In this case, similarly, a terminal device 30 located in the same area is not able to connect to the network N1.

Therefore, in the third embodiment, a case in which the app distribution server 10 collects use data (which will be hereinafter referred to as "app use data") of the distribution app 2000 that has been executed by the terminal device 30 will be described. Thus, for example, at the end of a day, or the like, the app distribution server 10 is caused to move to a place in which it is possible to connect to the network N1, and thereby, transmission of the app use data to the app management server 20 is enabled.

The app use data herein is various types of data related to use of the distribution app 2000. For example, in a case in which the distribution app 2000 is a progress management app for a construction site, as the app use data, progress management data that has been generated by the distribution app 2000 is used. The app use data may include an operation log, a work log, or the like when the distribution app 2000 has been executed.

In the third embodiment, components with functions substantially identical to those in the first embodiment are identified by identical reference symbols and the description thereof will not be repeated.

Figure 14:
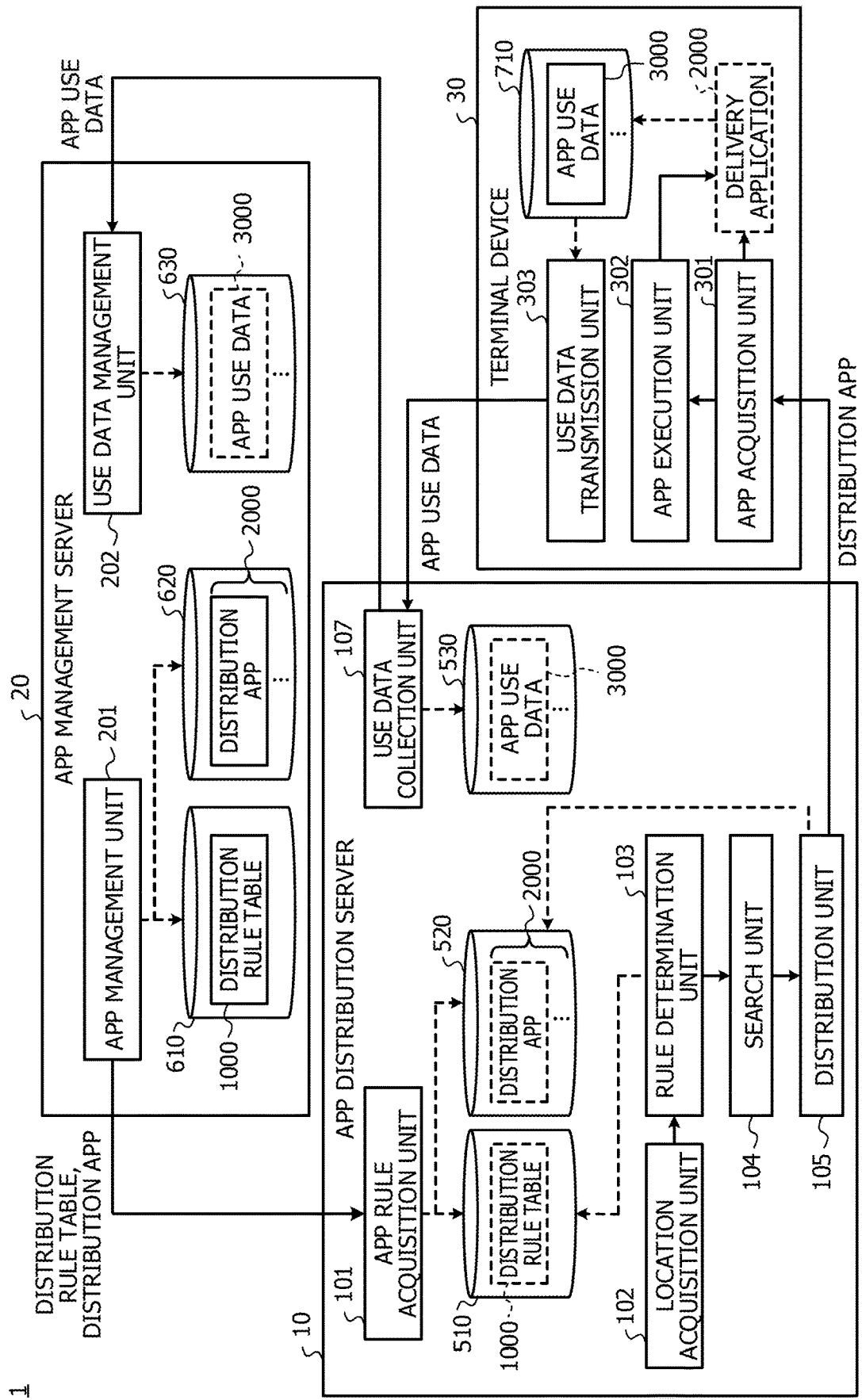
FIG. 14 is a diagram illustrating an example of a functional configuration of an app distribution system according to a third embodiment.

First, a functional configuration of the app distribution system 1 according to this embodiment will be described with reference to FIG. 14. FIG. 14 is a diagram illustrating an example of a functional configuration of the app distribution system 1 according to the third embodiment.

As illustrated in FIG. 14, the terminal device 30 according to this embodiment includes a use data transmission unit 303. This function unit is realized by processing that an app acquisition program 300 that has been installed in the terminal device 30 causes a CPU 27 to execute.

The terminal device 30 according to this embodiment includes an app use data storage unit 710. This storage unit may be realized by, for example, a storage device 28.

The use data transmission unit 303 transmits app use data 3000 that has been stored in the app use data storage unit 710 to an app distribution server 10. The use data transmission unit 303 deletes the app use data 3000 that has been transmitted to the app distribution server 10 from the app use data storage unit 710.

The app use data storage unit 710 stores the app use data 3000 that has been generated by the distribution app 2000.

As illustrated in FIG. 14, the app distribution server 10 according to this embodiment includes a use data collection unit 107. This function unit is realized by processing that an app distribution program 100 that has been installed in an app rule acquisition unit 101 causes a CPU 17 to execute.

The app distribution server 10 according to this embodiment includes an app use data storage unit 530. This storage unit may be realized, for example, using a storage unit 18.

The use data collection unit 107 collects the app use data 3000 that has been transmitted from the terminal device 30 and stores the app use data 3000 in the app use data storage unit 530. The use data collection unit 107 transmits the app use data 3000 that has been stored in the app use data storage unit 530 to the app management server 20. Furthermore, the use data collection unit 107 deletes the app use data 3000 that has been transmitted to the app management server 20 from the app use data storage unit 530.

The app use data storage unit 530 stores the app use data 3000 that has been collected by the use data collection unit 107.

As illustrated in FIG. 14, the app management server 20 according to this embodiment includes an app management unit 201. This function unit is realized by processing that an app management program 200 that has been installed in the app management server 20 causes the CPU 27 to execute.

The app management server 20 according to this embodiment includes an app use data storage unit 630. This storage unit may be realized, for example, using the storage device 28. This storage unit may be realized using a storage device that is coupled to the app management server 20 via the network N1.

A use data management unit 202 stores the app use data 3000 that has been transmitted from the app distribution server 10 in the app use data storage unit 630.

The app use data storage unit 630 stores the app use data 3000 that has been transmitted from the app distribution server 10. The app administrator is able to perform, for example, management of the state of progress of a construction, analysis of a use state of the distribution app 2000, or the like, using the app use data 3000 that has been stored in the app use data storage unit 630 of the app management server 20.

Next, details of processing of the app distribution system 1 according to this embodiment will be described. Acquisition processing of acquiring a distribution rule table and a distribution app, which is illustrated in FIG. 7, distribution processing of distributing a distribution app in the app distribution server 10, which is illustrated in FIG. 8, and processing of distributing a distribution app to the terminal device 30, which is illustrated in FIG. 10, are similar to those in the first embodiment, and therefore, the description thereof will be omitted.

Figure 15:
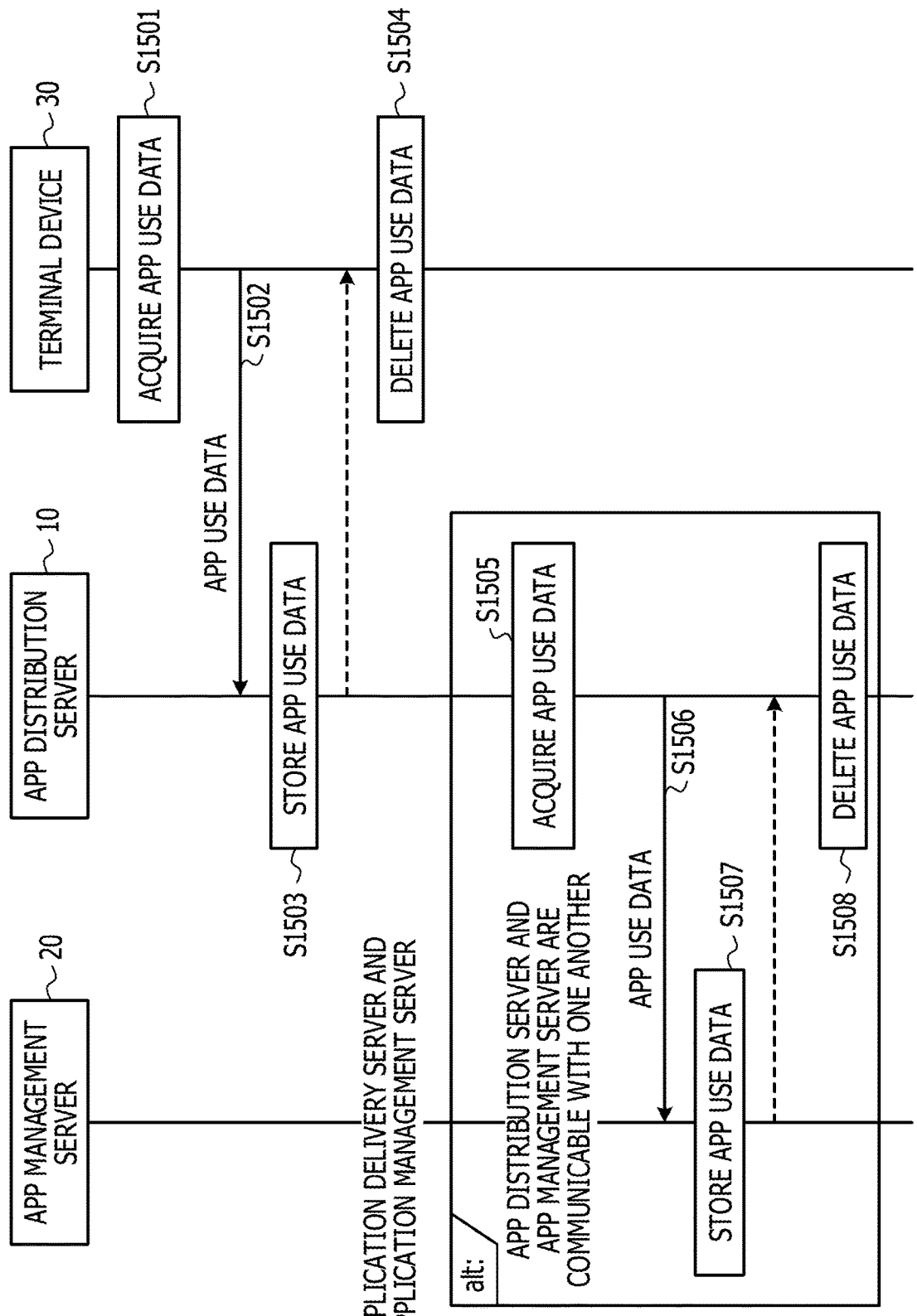
FIG. 15 is a sequence diagram illustrating an example of processing of collecting app use data from a terminal device according to the third embodiment.

Processing in which the app distribution server 10 collects the app use data 3000 from the terminal device 30 and transmits the collected app use data 3000 to the app management server 20 will be described with reference to FIG. 15. FIG. 15 is a sequence diagram illustrating an example of processing of collecting app use data from the terminal device 30 according to the third embodiment.

First, the use data transmission unit 303 of the terminal device 30 acquires the app use data 3000 that has been stored in the app use data storage unit 710 (S1501).

The use data transmission unit 303 may be configured to acquire, for example, when it is detected that a communication with the app distribution server 10 via the network N2 is possible, the app use data 3000 from the app use data storage unit 710. The use data transmission unit 303 may be configured to acquire the app use data 3000 from the app use data storage unit 710, for example, in accordance with an operation that is performed by an app user.

Next, the use data transmission unit 303 of the terminal device 30 transmits the app use data 3000 that has been acquired from the app use data storage unit 710 to the app distribution server 10 via the network N2 (S1502).

When the use data collection unit 107 of the app distribution server 10 receives the app use data 3000 from the terminal device 30, the use data collection unit 107 stores the received app use data 3000 in the app use data storage unit 530 (S1503). Then, the app distribution server 10 sends back information that indicates that the app use data 3000 has been stored to the terminal device 30.

When the use data transmission unit 303 of the terminal device 30 receives the information that indicates that the app use data 3000 has been stored, the use data transmission unit 303 deletes the app use data 3000 from the app use data storage unit 710 (S1504).

Thus, the app use data 3000 that has been generated by execution of the distribution app 2000 by each terminal device 30 is collected in the app distribution server 10.

In this case, it is assumed that, for example, an app provider causes the app distribution server 10 to move, and thereby, the app distribution server 10 and the app management server 20 are enabled to communicate with one another via the network N1.

In this case, the use data collection unit 107 of the app distribution server 10 acquires the app use data 3000 that has been stored in the app use data storage unit 530 (S1505).

The use data collection unit 107 may be configured to acquire, for example, when it is detected that a communication with the app management server 20 via the network N1 is possible, the app use data 3000 from the app use data storage unit 530. The use data collection unit 107 may be configured to acquire the app use data 3000 from the app use data storage unit 530, for example, in accordance with an operation that is performed by the app provider.

Next, the use data collection unit 107 of the app distribution server 10 transmits the app use data 3000 that has been acquired from the app use data storage unit 530 to the app management server 20 via the network N1 (S1506).

When the use data management unit 202 of the app management server 20 receives the app use data 3000 from the app distribution server 10, the use data management unit 202 stores the received app use data 3000 in the app use data storage unit 630 (S1507). Then, the app management server 20 sends back information that indicates that the app use data 3000 has been stored to the app distribution server 10.

When the use data collection unit 107 of the app distribution server 10 receives the information that indicates that the app use data 3000 has been stored, the use data collection unit 107 deletes the app use data 3000 from the app use data storage unit 530 (S1508).

Thus, the app use data 3000 that has been collected by the app distribution server 10 is managed in the app management server 20.

As has been described above, in the app distribution system 1 according to this embodiment, for example, in a place in which it is not possible to connect to the network N1, or the like, the app distribution server 10 collects the app use data 3000 of the distribution app 2000 that has been distributed to the terminal device 30. Then, in the app distribution system 1 according to this embodiment, for example, when the app distribution server 10 has been caused to move to a place in which it is possible to connect to the network N1, the app distribution server 10 transmits the collected app use data 3000 to the app management server 20.

Thus, in the app distribution system 1 according to this embodiment, the app use data 3000 of the application 2000 that has been distributed in a place, such as, for example, a tunnel or the like, in which it is not possible to connect to the network N1 may be managed in the app management server 20.

Fourth Embodiment

Next, a fourth embodiment will be described. In each of the first to third embodiments, a case in which an app provider carries an app distribution server 10 and installs or the like the app distribution server 10 has been described and, in the fourth embodiment, a case in which an app distribution server 10 autonomously moves will be described. In the fourth embodiment, components with functions substantially identical to those in the first embodiment are identified by identical reference symbols and the description thereof will not be repeated.

Figure 16:
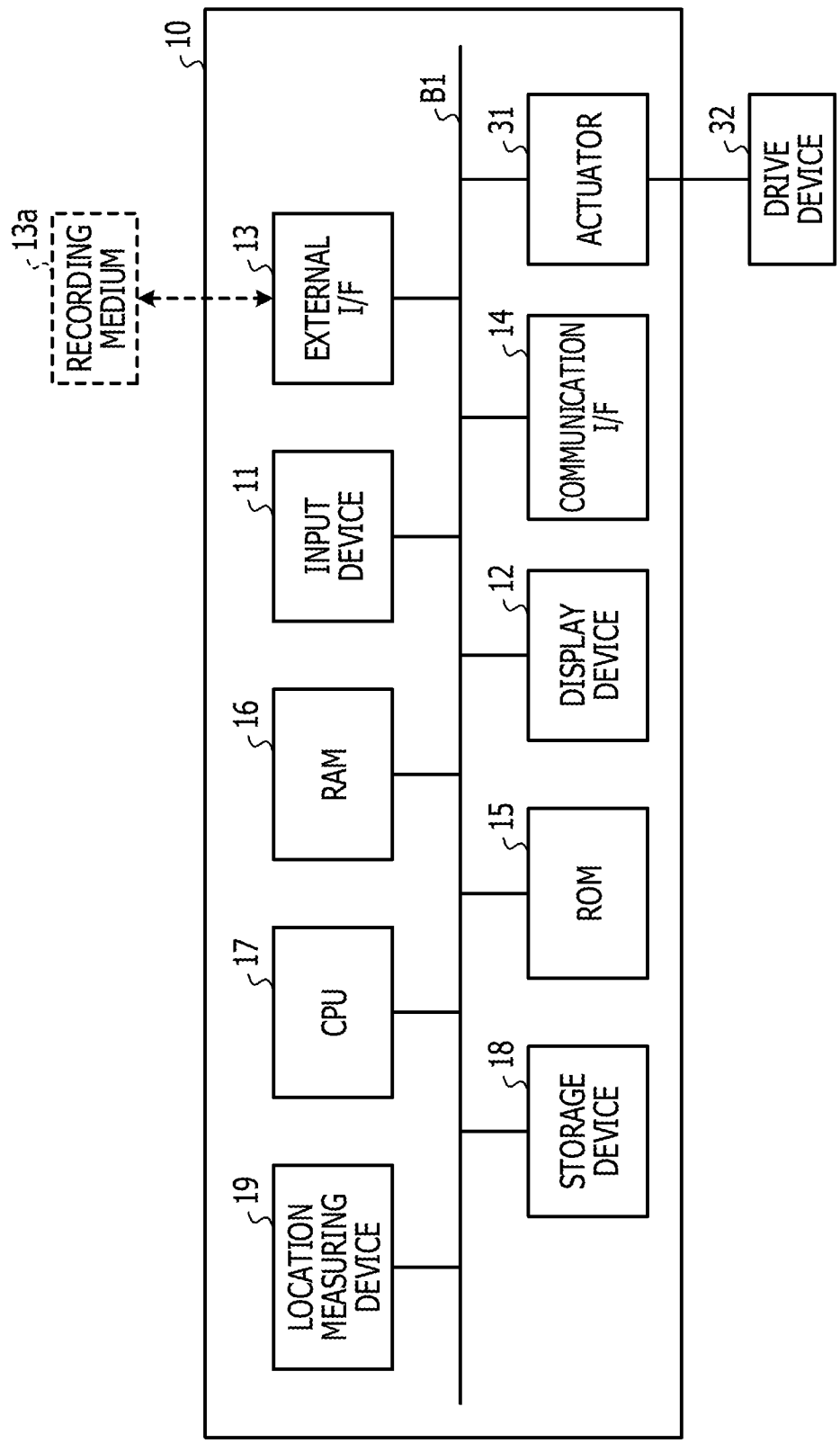
FIG. 16 is a diagram illustrating an example of a hardware configuration of an app distribution server according to a fourth embodiment.

First, a hardware configuration of the app distribution server 10 according to this embodiment will be described with reference to FIG. 16. FIG. 16 is a diagram illustrating an example of a hardware configuration of the app distribution server 10 according to the fourth embodiment.

As illustrated in FIG. 16, the app distribution server 10 according to this embodiment includes an actuator 31. The actuator 31 controls a drive device 32 that causes the app distribution server 10 to move in accordance with control of a CPU 17. The drive device 32 is a tire, a propeller, a thruster, or a walking part (that is, a part that is to be leg and foot of a robot or the like).

Figure 17:
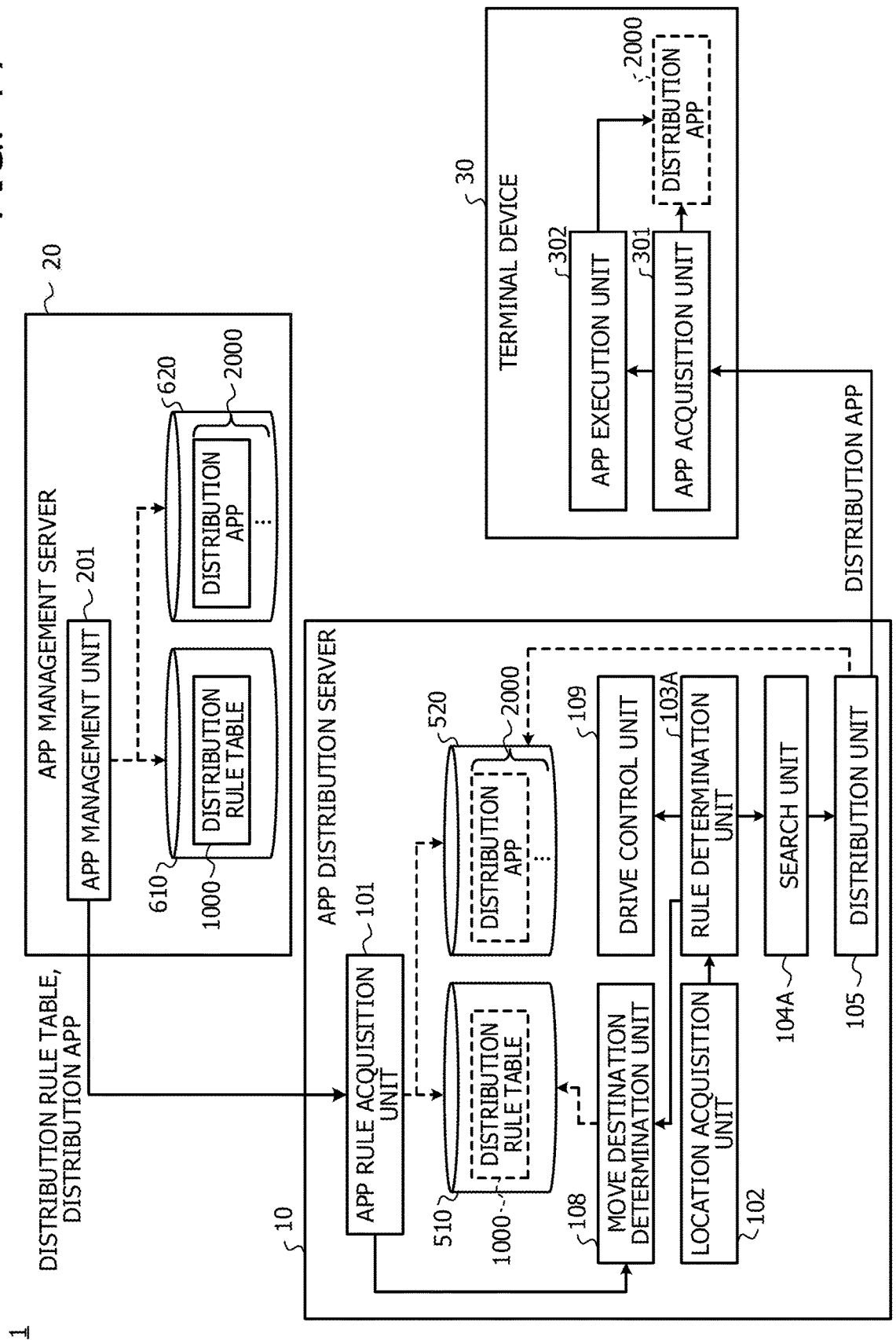
FIG. 17 is a diagram illustrating an example of a functional configuration of an app distribution system according to the fourth embodiment.

Next, a functional configuration of the app distribution server 10 according to this embodiment will be described with reference to FIG. 17. FIG. 17 is a diagram illustrating an example of a functional configuration of the app distribution system 1 according to the fourth embodiment.

As illustrated in FIG. 17, the app distribution server 10 according to this embodiment includes a move destination determination unit 108, a drive control unit 109, a rule determination unit 103A, and a search unit 104A. Each of these function units is realized by processing that an app distribution program 100 that has been installed in the app distribution server 10 causes the CPU 17 to execute.

The move destination determination unit 108 refers to a distribution rule table 1000 and determines a move destination of the app distribution server 10. That is, the move destination determination unit 108 acquires a distribution rule from the distribution rule table 1000 and determines, as a move destination, a certain location included in a distribution area defined in the acquired distribution rule. The certain location may be, for example, a location that indicates the center of the distribution area, a location that corresponds to the center of gravity of the distribution area, or the like.

The drive control unit 109 controls the drive device 32 and causes the app distribution server 10 to move to the move destination that has been determined by the move destination determination unit 108. The drive control unit 109 controls the drive device 32 and causes the app distribution server 10 to move to a location in which a communication with the app management server 20 via a network N1 is possible.

The rule determination unit 103A determines whether or not a move to the move destination that has been determined by the move destination determination unit 108 is completed.

If it has been determined by the rule determination unit 103A that the move is completed, the search unit 104A searches a terminal device 30 that is communicable via a network N2.

Next, details of processing of the app distribution system 1 according to this embodiment will be described. Acquisition processing of acquiring a distribution rule table and a distribution app, which is illustrated in FIG. 7, and processing of distributing a distribution app to the terminal device 30, which is illustrated in FIG. 10, are similar to those in the first embodiment, and therefore, the description thereof will be omitted.

Figure 18:
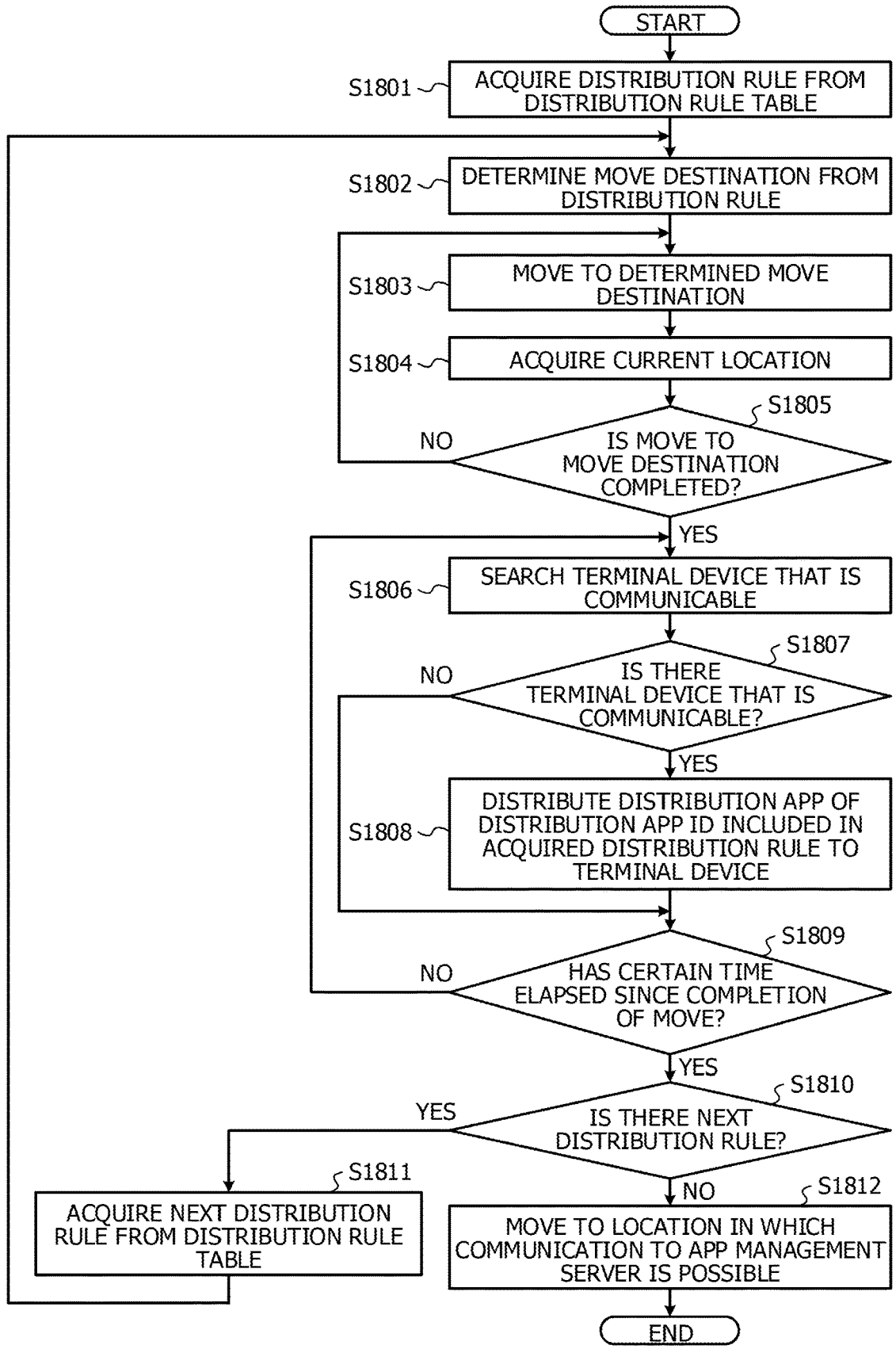
FIG. 18 is a flowchart illustrating an example of distribution processing of distributing a distribution app in an app distribution server according to the fourth embodiment.

Processing in which, after the app distribution server 10 stores the distribution rule table 1000 and a distribution app 2000, the app distribution server 10 autonomously moves and distributes the distribution app 2000 to the terminal device 30 will be described with reference to FIG. 18. FIG. 18 is a flowchart illustrating an example of distribution processing of distributing a distribution app in the app distribution server 10 according to the fourth embodiment.

First, the move destination determination unit 108 acquires a single distribution rule from the distribution rule table 1000 (S1801). That is, the move destination determination unit 108 acquires, for example, a distribution rule of a rule ID "r001" from the distribution rule table 1000.

Next, the move destination determination unit 108 determines, as a move destination, a certain location included in a distribution area that is defined in the distribution rule that has been acquired (S1802).

Next, the drive control unit 109 moves the app distribution server 10 to the move destination that has been determined by the move destination determination unit 108 (S1803).

Next, the location acquisition unit 102 acquires location information (information that indicates the current location of the app distribution server 10) which has been measured by a location measuring device 19 (S1804).

Next, the rule determination unit 103A determines whether or not a move to the move destination that has been determined by the move destination determination unit 108 is completed (S1805). That is, the rule determination unit 103A determines whether or not a location that is indicated by the location information that has been acquired by the location acquisition unit 102 is a location that is indicated by the move destination that has been determined by the move destination determination unit 108. The rule determination unit 103A may be configured to determine whether or not the location that is indicated by the location information that has been acquired by the location acquisition unit 102 is in a certain range (that is, in an error margin) from the location that is indicated by the move destination that has been determined by the move destination determination unit 108.

In S1805, if it has been determined by the rule determination unit 103A that the move to the move destination is not completed, the app distribution server 10 causes the process to return to processing of S1805. In this case, the move to the move destination that has been determined by the move destination determination unit 108 is not completed, and therefore, the app distribution server 10 sequentially continues the move.

On the other hand, in S1805, if it has been determined by the rule determination unit 103A that the move to the move destination is completed, the search unit 104A searches the terminal device 30 that is communicable via the network N2 (S1806). The search unit 104A may be configured to search the terminal device 30, for example, by a similar method to that in processing of S803 of FIG. 8.

Next, the search unit 104A determines whether or not one or more terminal devices 30 that are communicable via the network N2 have been searched (S1807).

If one or more terminal devices 30 that are communicable via the network N2 have been searched by the search unit 104A in S1807, the distribution unit 105 distributes the distribution app 2000 that corresponds to a distribution area to the one of more terminal devices 30 that have been searched (S1808). Similar to S804 of FIG. 8, the distribution unit 105 refers to the distribution rule table 1000 and acquires the distribution app 2000 of the distribution app ID that corresponds to the distribution area that has been determined to include the current location of the app distribution server 10 from a distribution app storage unit 520. Then, the distribution unit 105 distributes the acquired distribution app 2000 to the one or more terminal devices 30 that have been searched.

On the other hand, if the terminal device 30 that is communicable via the network N2 has not been searched by the search unit 104A in S1807, or subsequent to S1808, the move destination determination unit 108 determines whether or not a certain time has elapsed since the completion of the move to the move destination (S1809).

If it has been determined by the move destination determination unit 108 that the certain time has not elapsed since the completion of the move to the move destination in S1809, the app distribution server 10 causes the process to return to processing of S1806. As described above, the app distribution server 10 stays in the corresponding move destination until the certain time has elapsed since the completion of the move to the move destination.

On the other hand, if it has been determined by the move destination determination unit 108 that the certain time has elapsed since the completion of the move to the move destination in S1809, the move destination determination unit 108 determines whether or not there is a next distribution rule in the distribution rule table 1000 (S1810).

If it has been determined by the move destination determination unit 108 that there is a next distribution rule in S1810, the move destination determination unit 108 acquires the next distribution rule from the distribution rule table 1000 (S1811). That is, for example, if the move destination determination unit 108 has acquired the distribution rule of the rule ID "r001", the move destination determination unit 108 acquires the distribution rule of the rule ID "r002".

Then, after the next distribution rule has been acquired from the distribution rule table 1000, the app distribution server 10 causes the process to return to processing of S1802.

On the other hand, if it has been determined by the move destination determination unit 108 that there is not a next distribution rule in S1810, the drive control unit 109 causes the app distribution server 10 to move to a location in which a communication with the app management server 20 via the network N1 is possible (S1812). The location in which a communication with the app management server 20 via the network N1 is possible is, for example, a location that has been set in advance by the app provider or the like, and is a location in which a communication with an access point of a wireless LAN that is connectable to the network N1 is possible, or the like.

As has been described, in the app distribution system 1 according to this embodiment, the app distribution server 10 autonomously moves to a certain location included in each distribution area that is defined in the distribution rule table 1000, and then, the distribution app 2000 is distributed. Thus, in the app distribution system 1 according to this embodiment, the distribution app 2000 may be distributed such that the app provider is not desired to carry the app distribution server 10 and install or the like the app distribution server 10.

In the app distribution system 1 according to this embodiment, the app distribution server 10 moves to each distribution area that is defined in the distribution rule table 1000, and then, moves to a location in which a communication with the app management server 20 via the network N1 is possible. Thus, the app distribution server 10 is able to perform, for example, an update of the distribution rule table 1000 and the distribution app 2000. Furthermore, in this case, the app distribution server 10 may be configured to also transmit the app use data 3000 that has been collected from each terminal device 30 to the app management server 20, as described in the third embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method executed by a processor included in an information processing device, the information processing device including a sensor, the information processing method comprising:

acquiring information of a location in which the information processing device is installed using the sensor;

determining whether a distribution area including the location exists in distribution rule information in which an application and the distribution area are associated with each another for each of a plurality of applications;

specifying a terminal device of which communication via a network is possible when it is determined that the distribution area including the location exists in the distribution rule information;

extracting, from among the plurality of applications, one or more applications corresponding to the distribution area including the location by referring to the distribution rule information; and transmitting the extracted one or more applications to the specified terminal device.

2. The information processing method according to claim 1, wherein the information processing device includes an actuator that controls a move of the information processing device, and the information processing method further includes causing the actuator to move the information processing device to the distribution area with which one or more applications are associated, and the specifying includes specifying the terminal device that can communicate with the information processing device via the network after the move.

3. The information processing method according to claim 1, wherein the specifying the terminal device includes specifying the terminal device by transmitting a beacon signal to a surrounding and receiving a response to the beacon signal from the terminal device.

4. The information processing method according to claim 1, wherein the specifying the terminal device includes specifying the terminal device by transmitting a packet to a surrounding and receiving a response to the packet from the terminal device.

5. The information processing method according to claim 1, further comprising:

searching the terminal device after a predetermined time has elapsed when the terminal device configured to communicate via the network has not been specified.

6. The information processing method according to claim 1, wherein
the distribution area is associated with rule information with which the application, the distribution area, and a time slot are associated, and
the extracting includes extracting the application corresponding to the time slot to which a target time belongs and the distribution area including the location from the plurality of applications by referring to the distribution rule information.

7. The information processing method according to claim 1,
wherein the distribution area is associated with rule information with which the application, the distribution area, and a class indicating a belonging destination are associated, and
the extracting includes extracting the application corresponding to the class of the specified terminal device and the distribution area including the location from the plurality of applications by referring to the distribution rule information.

8. The information processing method according to claim 1, further comprising:
acquiring use data of the extracted application from the terminal device; and
transmitting the acquired use data to the management server when the information processing device moves to a place in which the information processing device can communicate with the management server.

9. An information processing device, comprising:
a sensor; and
a processor coupled to the sensor and configured to:
acquire information of a location in which the information processing device is installed using the sensor,
determine whether a distribution area including the location exists in distribution rule information in which an application and the distribution area are associated with each another for each of a plurality of applications,
specify a terminal device of which communication via a network is possible when it is determined that the distribution area including the location exists in the distribution rule information,
extract, from among the plurality of applications, one or more applications corresponding to the distribution area including the location by referring to the distribution rule information, and
transmit the extracted application to the specified terminal device.

10. The information processing device according to claim 9,
wherein the processor is configured to specify the terminal device by transmitting a beacon signal to a surrounding and receiving a response to the beacon signal from the terminal device.

11. The information processing device according to claim 9,
wherein the processor is configured to specify the terminal device by transmitting a packet to a surrounding and receiving a response to the packet from the terminal device.

12. The information processing device according to claim 9,
wherein the processor is configured to search the terminal device after a predetermined time has elapsed when the terminal device configured to communicate via the network has not been specified.

13. The information processing device according to claim 9, wherein
the distribution area is associated with rule information with which the application, the distribution area, and a time slot are associated, and
the processor is configured to extract the application corresponding to the time slot to which a target time belongs and the distribution area including the location from the plurality of applications by referring to the distribution rule information.

14. An information processing system, comprising:
a first computer; and
a second computer coupled to the first computer, having a sensor, and configured to:
acquire, from the first computer, a plurality of applications and distribution rule information in which an application and the distribution area are associated with each other for each of the plurality of applications,
acquire information of a location in which the information processing device is installed using the sensor,
determine whether a distribution area including the location exists in the distribution rule information,
specify a terminal device of which communication via a network is possible when it is determined that the distribution area including the location exists in the distribution rule information,
extract, from among the plurality of applications, one or more applications corresponding to the distribution area including the location by referring to the distribution rule information, and
transmit the extracted application to the specified terminal device.

15. The information processing method according to claim 1,
wherein the distribution area included in the distribution rule information is represented by two coordinates each defined by latitude, longitude and altitude.

16. The information processing method according to claim 15,
wherein the distribution area included in the distribution rule information is represented by the two coordinates corresponding to two points in the distribution area, and
the distribution area is defined by a rectangular parallelepiped having a straight line connecting the two points as a diagonal.

* * * * *